United States Patent
Kamiya et al.

(10) Patent No.: US 10,775,011 B2
(45) Date of Patent: Sep. 15, 2020

(54) VEHICLE LAMP, VEHICLE LAMP CONTROL SYSTEM, AND VEHICLE PROVIDED WITH VEHICLE LAMP AND VEHICLE LAMP CONTROL SYSTEM

(71) Applicant: KOITO MANUFACTURING CO., LTD., Tokyo (JP)

(72) Inventors: Misako Kamiya, Shizuoka (JP); Takeshi Masuda, Shizuoka (JP); Hidetada Tanaka, Shizuoka (JP); Yuichi Shibata, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/087,744

(22) PCT Filed: Mar. 23, 2017

(86) PCT No.: PCT/JP2017/011796
§ 371 (c)(1),
(2) Date: Sep. 24, 2018

(87) PCT Pub. No.: WO2017/164328
PCT Pub. Date: Sep. 28, 2017

(65) Prior Publication Data
US 2019/0113197 A1 Apr. 18, 2019

(30) Foreign Application Priority Data

Mar. 24, 2016 (JP) .................................. 2016-059877
Apr. 15, 2016 (JP) .................................. 2016-082004

(51) Int. Cl.
*F21S 41/143* (2018.01)
*F21S 41/32* (2018.01)
(Continued)

(52) U.S. Cl.
CPC .............. *F21S 41/143* (2018.01); *B60Q 1/00* (2013.01); *F21S 41/00* (2018.01); *F21S 41/19* (2018.01);
(Continued)

(58) Field of Classification Search
CPC combination set(s) only.
See application file for complete search history.

(56) References Cited

U.S. PATENT DOCUMENTS

| | | |
|---|---|---|
| 2005/0041434 A1 | 2/2005 | Yatsuda et al. |
| 2008/0253141 A1 | 10/2008 | Nakada et al. |

(Continued)

FOREIGN PATENT DOCUMENTS

| | | |
|---|---|---|
| CN | 1583465 A | 2/2005 |
| CN | 104169641 A | 11/2014 |

(Continued)

OTHER PUBLICATIONS

Written Opinion (PCT/ISA/237) issued by the International Searching Authority in corresponding International Application No. PCT/JP2017/011796, dated Jun. 13, 2017.

(Continued)

*Primary Examiner* — Joseph L Williams
*Assistant Examiner* — Jacob R Stern
(74) *Attorney, Agent, or Firm* — Sughrue Mion, PLLC

(57) ABSTRACT

A vehicle lamp includes a light source unit for road surface drawing capable of forming a light source image longer in an upper and lower direction than a left and right direction of the lamp and a projection lens through which light forming the light source image is transmitted and which projects a predetermined light distribution pattern on a road surface. A light emitting surface or a light transmitting surface of the light source unit is disposed in a vicinity of a rear focal point of the projection lens. The light emitting (Continued)

surface or the light transmitting surface is inclined with respect to an upper and lower direction orthogonal to an optical axis of the projection lens.

13 Claims, 19 Drawing Sheets

(51) Int. Cl.

| | | |
|---|---|---|
| F21S 41/19 | (2018.01) | |
| F21S 41/00 | (2018.01) | |
| F21S 43/00 | (2018.01) | |
| B60Q 1/00 | (2006.01) | |
| F21S 43/40 | (2018.01) | |
| F21S 43/249 | (2018.01) | |
| F21S 43/14 | (2018.01) | |
| F21S 43/16 | (2018.01) | |
| F21S 43/243 | (2018.01) | |
| F21S 43/241 | (2018.01) | |
| F21S 43/20 | (2018.01) | |
| F21S 43/145 | (2018.01) | |
| F21S 41/24 | (2018.01) | |
| F21S 41/25 | (2018.01) | |
| F21S 41/29 | (2018.01) | |
| F21S 41/43 | (2018.01) | |
| F21W 102/17 | (2018.01) | |
| F21Y 105/12 | (2016.01) | |

(52) U.S. Cl.
CPC ............... *F21S 41/24* (2018.01); *F21S 41/25* (2018.01); *F21S 41/295* (2018.01); *F21S 41/32* (2018.01); *F21S 41/43* (2018.01); *F21S 43/00* (2018.01); *F21S 43/14* (2018.01); *F21S 43/145* (2018.01); *F21S 43/16* (2018.01); *F21S 43/241* (2018.01); *F21S 43/243* (2018.01); *F21S 43/249* (2018.01); *F21S 43/26* (2018.01); *F21S 43/40* (2018.01); *B60Q 2300/45* (2013.01); *F21W 2102/17* (2018.01); *F21Y 2105/12* (2016.08)

(56) References Cited

U.S. PATENT DOCUMENTS

| | | |
|---|---|---|
| 2009/0046474 A1* | 2/2009 | Sato ..................... B60Q 1/076 362/466 |
| 2010/0315828 A1 | 12/2010 | Yatsuda et al. |
| 2014/0376244 A1 | 12/2014 | Tsutsumi et al. |
| 2016/0040848 A1 | 2/2016 | Tsukamoto |
| 2016/0097494 A1 | 4/2016 | Su et al. |
| 2016/0334074 A1 | 11/2016 | Fukui et al. |
| 2016/0341386 A1 | 11/2016 | Iha et al. |
| 2017/0009950 A1 | 1/2017 | Lin et al. |
| 2017/0009951 A1 | 1/2017 | Lin et al. |
| 2017/0130924 A1 | 5/2017 | Kawai et al. |
| 2017/0227184 A1 | 8/2017 | Ishida et al. |

FOREIGN PATENT DOCUMENTS

| | | |
|---|---|---|
| CN | 105066062 A | 11/2015 |
| EP | 2578452 A1 | 4/2013 |
| EP | 2 743 567 A1 | 6/2014 |
| JP | 2008-262755 A | 10/2008 |
| JP | 2011-129376 A | 6/2011 |
| JP | 2012-199161 A | 10/2012 |
| JP | 2013-82253 A | 5/2013 |
| JP | 2015-230768 A | 12/2015 |
| JP | 2016-39021 A | 3/2016 |
| TW | I513938 B | 12/2015 |
| WO | 2015/107678 A1 | 7/2015 |
| WO | 2015/129251 A1 | 9/2015 |
| WO | 2016/013447 A1 | 1/2016 |

OTHER PUBLICATIONS

International Search Report (PCT/ISA/210), issued by International Searching Authority in corresponding International Application No. PCT/JP2017/011796, dated Jun. 13, 2017.

Communication dated Nov. 8, 2019, issued by the European Patent Office in counterpart European Application No. 17770368.3.

Communication dated May 8, 2020 issued by the State Intellectual Property Office of P.R. China in counterpart Chinese Application No. 201780019710.0.

* cited by examiner

VEHICLE LAMP, VEHICLE LAMP CONTROL SYSTEM, AND VEHICLE PROVIDED WITH VEHICLE LAMP AND VEHICLE LAMP CONTROL SYSTEM

TECHNICAL FIELD

The disclosure relates to a vehicle lamp capable of irradiating a light distribution pattern for, in particular, road surface drawing, a vehicle lamp control system, and a vehicle including the vehicle lamp and the vehicle lamp control system.

Further, the disclosure relates to a vehicle lamp including a laser light source for road surface drawing, and a vehicle including the vehicle lamp.

BACKGROUND ART

Patent Document 1 discloses a vehicle spot lamp system which controls the irradiation of light by a vehicle spot lamp such that a pedestrian position detected by a position detection device is acquired, a risk level of collision of a vehicle with the pedestrian by using the pedestrian position and the vehicle speed is determined, and light is irradiated toward the pedestrian position while repeating the change of the irradiation width when the risk level is high.

Patent Document 2 discloses a vehicle lamp which includes an LED light source, a laser light source, and an optical system for forming a light distribution pattern by light emitted from the LED light source and the laser light source, respectively. The LED light source and the optical system are configured to form a low-beam light distribution pattern, and the laser light source and the optical system are configured to form a high luminance region located near the center portion of the light distribution pattern and having a cutoff line.

CITATION LIST

Patent Document

Patent Document 1: Japanese Patent Laid-Open Publication No. 2013-82253
Patent Document 2: Japanese Patent Laid-Open Publication No. 2015-230768

DISCLOSURE OF INVENTION

Problems to be Solved by Invention

The vehicle spot lamp disclosed in Patent Document 1 includes a light emitting unit in which a plurality of light emitting elements made of LEDs are juxtaposed in three rows in the vertical direction. This vehicle spot lamp forms a light distribution pattern extending toward a pedestrian by irradiating light to a region where a pedestrian exists and a region before it, and informs a driver that a pedestrian exists in an extending direction of the light. By the way, in Patent Document 1, the light emitting surfaces of the plurality of light emitting elements are arranged so as to be positioned on the rear focal plane of the projection lens. Therefore, as shown in FIGS. 6 and 7 in Patent Document 1, the irradiation width of the light source image irradiating a place distant from a vehicle is wider than the irradiation width of the light source image irradiating the vicinity of the vehicle, and it is difficult to obtain a light distribution pattern having a uniform irradiation width from the vicinity to the place distant from the vehicle.

Further, there is a demand to form a rectangular or linear light distribution pattern as a road surface drawing mark by using the laser light source as disclosed in Patent Document 2. At this time, it is preferable that the rectangular or linear light distribution pattern is made uniformly distributed without uneven illuminance.

A first object of the disclosure is to provide a vehicle lamp and a vehicle lamp control system capable of obtaining a light distribution pattern having a uniform irradiation width from the vicinity to a place distant from a vehicle with a simple configuration, and a vehicle including the vehicle lamp and the vehicle lamp control system.

Further, a second object of the disclosure is to provide a vehicle lamp capable of forming a rectangular or linear light distribution pattern with less illuminance unevenness by using a laser light source, and a vehicle including the vehicle lamp.

Means for Solving the Problems

In order to achieve the first object, a vehicle lamp according to the disclosure includes
a light source unit for road surface drawing capable of forming a light source image longer in an upper and lower direction than a left and right direction of the lamp, and
a projection lens through which light forming the light source image is transmitted and which projects a predetermined light distribution pattern on a road surface,
in which a light emitting surface or a light transmitting surface of the light source unit is disposed in the vicinity of a rear focal point of the projection lens, and
in which the light emitting surface or the light transmitting surface is inclined with respect to an upper and lower direction orthogonal to an optical axis of the projection lens.

According to this configuration, for example, when detecting an object such as a pedestrian and drawing a light distribution pattern extending largely in the front and rear direction more than the left and right direction on a road surface toward the direction of the detected object, it is possible to irradiate a light distribution pattern having a uniform irradiation width from the vicinity to a place distant from a vehicle with a simple configuration.

The light source unit may include one light emitting element which is disposed in the vicinity of the rear focal point and capable of forming a light source image extending upward from the side of the optical axis, and
the light emitting surface of the light emitting element may be arranged in an inclined manner so as to be farther separated to the rear side than the rear focal point toward the upward direction.

The light source unit may include a plurality of light emitting elements which are disposed in the vicinity of the rear focal point, which are arranged so as to be able to form a light source image extending upward from the side of the optical axis, and which can be individually turned on and off, and
light emitting surfaces of the plurality of light emitting elements may be arranged in an inclined manner so as to be father separated to the rear side than the rear focal point from the light emitting element disposed in the vicinity of the rear focal point toward the light emitting elements on the upward direction side thereof.

The light source unit may include at least one light emitting element and a light shielding member located between the at least one light emitting element and the projection lens and disposed on the rear focal point, the light shielding member may have an opening portion extending upward from the side of the optical axis, and a light transmitting surface of the light shielding member may be arranged in an inclined manner so as to be farther separated to the rear side than the rear focal point toward the upward direction of the opening portion.

According to this configuration, it is possible to form a light source image having a wider upper end than a lower end within a rear focal plane of the projection lens.

Further, in order to achieve the first object, a vehicle lamp according to the disclosure includes a light source unit for road surface drawing capable of forming a light source image having a non-uniform width, and a projection lens through which light forming the light source image is transmitted and which projects a predetermined light distribution pattern on a road surface, in which, of the light source image within a focal plane of the projection lens, the region of the part projected on the place distant from the vehicle has a width in the left and right direction of the lamp narrower than the region of the part projected on the vicinity of the vehicle.

According to this configuration, it is possible to irradiate a light distribution pattern having a uniform irradiation width from the vicinity to a place distant from a vehicle with a simple configuration.

The light source unit may include one light emitting element which is disposed in the vicinity of a rear focal point of the projection lens and capable of forming a light source image extending upward from the side of an optical axis of the projection lens, and the width of the light emitting element may be increased from the vicinity of the rear focal point toward the upper side.

The light source unit may include a plurality of light emitting elements which are disposed in the vicinity of a rear focal point of the projection lens, which are arranged so as to be able to form a light source image extending upward from the side of an optical axis of the projection lens, and which can be individually turned on and of, and the plurality of light emitting elements may be arranged such that the number thereof increases from the light emitting element disposed in the vicinity of the rear focal point toward the light emitting elements on the upward direction side thereof.

The light source unit may include at least one light emitting element and a light shielding member located between the at least one light emitting element and the projection lens and disposed in the vicinity of a rear focal point of the projection lens, and the light shielding member may have an opening portion in which the width increases from the vicinity of the rear focal point toward the upper side.

According to this configuration, it is possible to form a light source image having a wider upper end than a lower end within a rear focal plane of the projection lens.

Further, in order to achieve the first object, a vehicle lamp control system according to the disclosure includes the vehicle lamp described above, and a lighting control unit configured to control the lighting of the plurality of light emitting elements, in which the lighting control unit changes the luminous intensity of each light emitting element according to a distance from the projection lens light distribution pattern projected on a road surface.

According to this configuration, it is possible to obtain a linear light distribution pattern having a uniform illuminance from the vicinity to a place distant from a vehicle.

Further, in order to achieve the second object, a vehicle lamp according to the disclosure includes a laser light source for road surface drawing, a projection lens through which laser light emitted from the laser light source is transmitted, and an optical member which is disposed between the laser light source and the projection lens and on which the laser light is incident, in which the optical member is configured to form a rectangular light source image in which the luminance is more uniform on an emission surface than an incident surface of the optical member.

According to this configuration, it is possible to form a light source image with less luminance unevenness and draw a rectangular light distribution pattern with less illuminance unevenness on a road surface by using the laser light source. Further, it is also possible to obtain a linear light distribution pattern with less illuminance unevenness by extending and projecting the rectangular light source image.

The optical member may include a light shielding member disposed in the vicinity of a rear focal point of the projection lens, and the light shielding member may have a rectangular opening portion through which at least a part of the laser light passes.

The optical member may include a diffusion member disposed in the vicinity of a rear focal point of the projection lens and in proximity to the laser light source, and an emission surface of the diffusion member may have a rectangular shape.

The optical member may include an additional lens disposed in the vicinity of a rear focal point of the projection lens, and an emission surface of the additional lens may have a rectangular shape.

According to these configurations, it is possible to equalize the illuminance of the rectangular light distribution pattern drawn on a road surface with a simple configuration.

The laser light source may emit excitation light, and the additional lens may include a phosphor layer excited by the excitation light and emitting fluorescence on its incidence surface or emission surface.

According to this configuration, the illuminance distribution of light can be made uniform by the phosphor layer.

The additional lens may be a rod integrator.

According to this configuration, the illuminance distribution can be made uniform by totally reflecting the laser light inside the rod integrator.

Further, in order to achieve the second object, a vehicle lamp according to another aspect of the disclosure includes a laser light source for road surface drawing, and a projection lens through which laser light emitted from the laser light source is transmitted, in which the laser light source includes a laser emitting part, a condenser lens configured to condense the laser light emitted from the laser emitting part, a housing configured to accommodate the laser emitting part and the condenser lens, and a phosphor disposed in the vicinity of a rear focal point of the projection lens, and in which an emission surface of the phosphor has a rectangular shape.

According to this configuration, it is possible to draw a rectangular or linear light distribution pattern with less illuminance unevenness on a road surface with a simple configuration including the laser light source and the projection lens.

The rectangular shape may be formed such that its width increases away from the rear focal point.

According to this configuration, it is possible to obtain a linear light distribution pattern having a uniform irradiation width.

An incidence surface or emission surface of the projection lens is formed with a step configured to make a light source image formed by the laser light larger in one of a left and right direction of the lamp and an upper and lower direction of the lamp than the other.

According to this configuration, since a linear light distribution pattern extending in the left and right direction or the front and rear direction of the vehicle can be drawn on a road surface, it is possible to inform a driver of desired information, thereby improving the safety of driving.

The laser light source may include a white laser diode, or a plurality of laser diodes for combining RGB light to irradiate white laser light.

According to this configuration, it is possible to draw a light distribution pattern formed of white light on a road surface.

Further, in order to achieve the first and second objects, a vehicle according to the disclosure includes the vehicle lamp described above or the vehicle lamp control system described above.

According to this configuration, it is possible to enhance the safety in the vehicle by installing the vehicle lamp or the vehicle lamp control system on the vehicle.

Effects of Invention

According to the disclosure, it is possible to provide the vehicle lamp capable of obtaining a light distribution pattern having a uniform irradiation width from the vicinity to a place distant from a vehicle with a simple configuration, the vehicle lamp control system, and the vehicle including the vehicle lamp and the vehicle lamp control system.

Further, according to the disclosure, it is possible to provide the vehicle lamp capable of forming a rectangular or linear light distribution pattern with less illuminance unevenness by using a laser light source, and the vehicle including the vehicle lamp.

EMBODIMENT FOR CARRYING OUT INVENTION

Hereinafter an example of an embodiment of the disclosure will be described in detail with reference to the drawings.

First Embodiment

Figure 1:
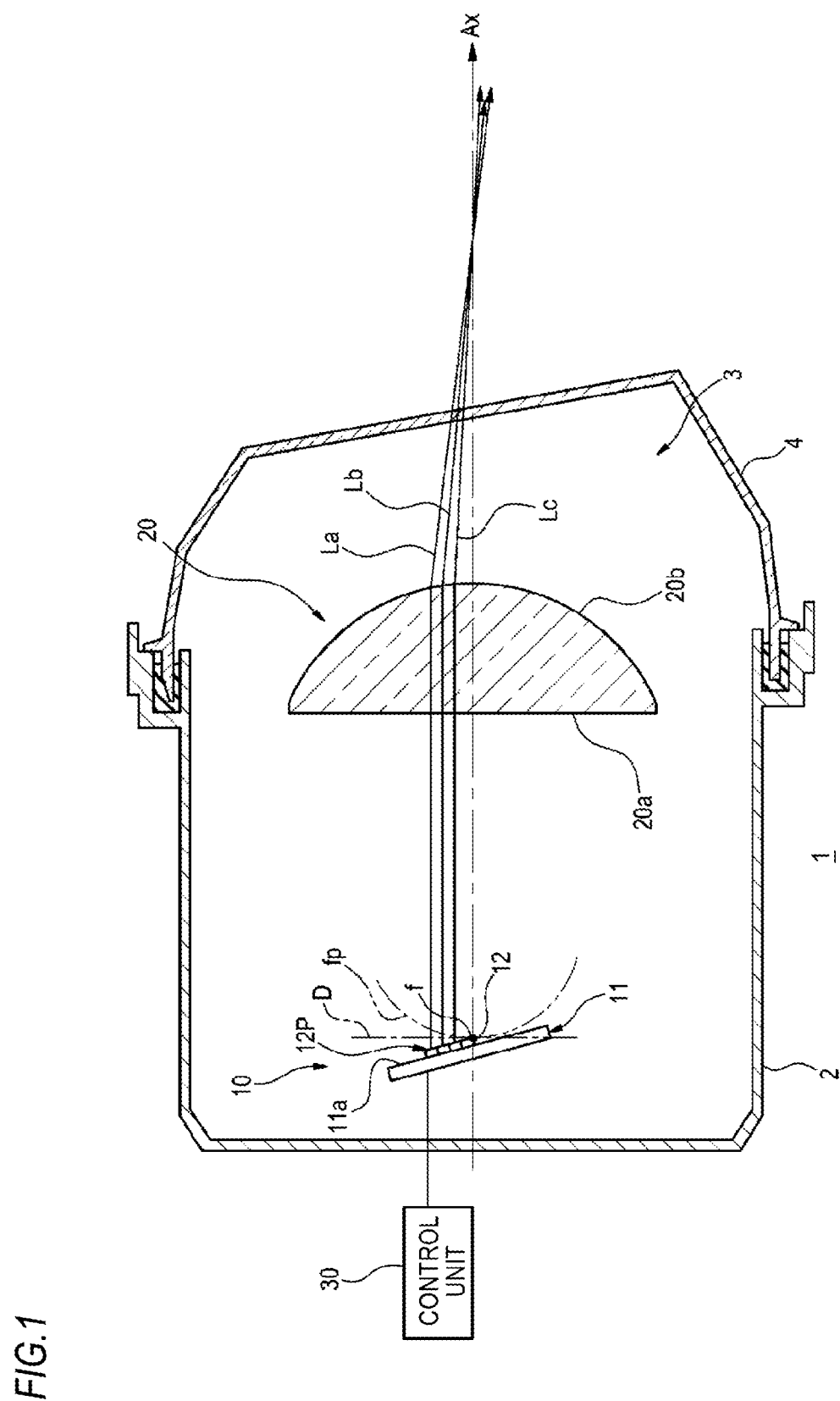
FIG. 1 is a vertical sectional view showing a schematic structure of a vehicle lamp, according to a first embodiment of the disclosure.
Figure 2:
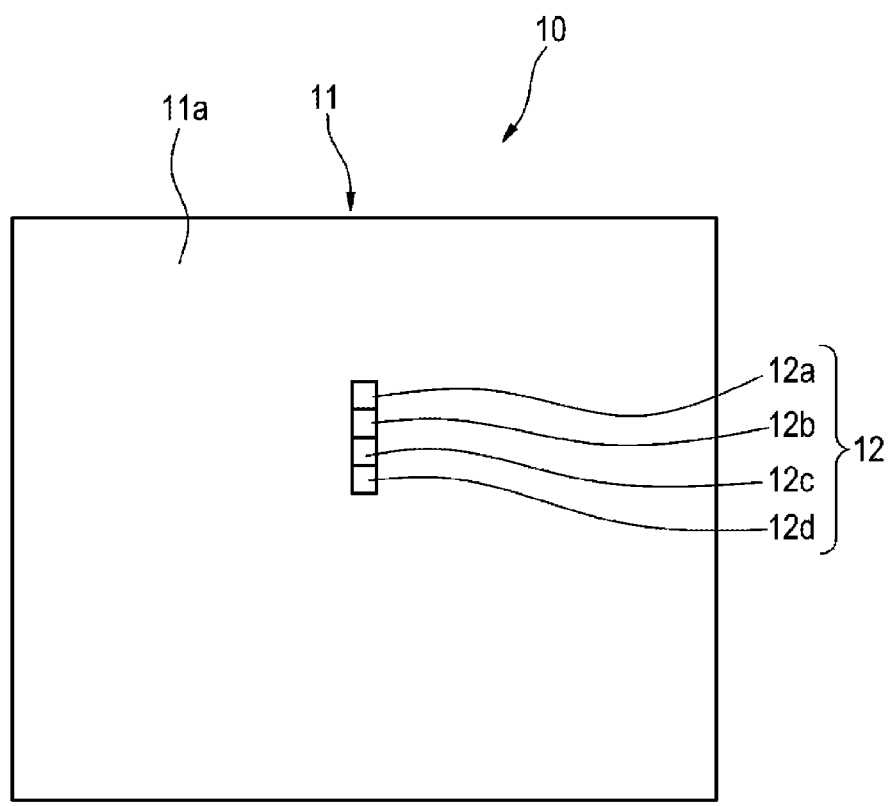
FIG. 2 is a front view of a light source according to the first embodiment.

FIG. 1 is a vertical sectional view showing a schematic structure of a vehicle lamp according to a first embodiment of the disclosure, and FIG. 2 is a front view of a light source shown in FIG. 1.

A vehicle lamp 1 according to the present embodiment is a road surface drawing lamp unit (road surface drawing device) mounted on at least one of a pair of headlamps arranged on the left and right sides of a vehicle. FIG. 1 shows a structure of the road surface drawing lamp unit mounted on one of the headlamps as the vehicle lamp 1.

As shown in FIG. 1, the vehicle lamp 1 includes a lamp body 2 having an opening portion on the vehicle front side, and a translucent cover 4 attached so as to cover the opening portion of the lamp body 2. The translucent cover 4 is formed of a light-transmitting resin, glass or the like. A light source 10 (an example of a light source unit) and a projection lens 20 are accommodated in a lamp chamber 3 which is defined by the lamp body 2 and the translucent cover 4. Each component is attached to the lamp body 2 by a support mechanism (not shown).

As shown in FIGS. 1 and 2, the light source 10 includes a plurality of (four in this example) LED chips (an example of a light emitting element) 12 (12a~12d) closely arranged on a chip mounting surface 11a of a substrate 11 along an upper and lower direction of the vehicle lamp 1. Meanwhile, the light emitting element may be configured by a semiconductor light emitting element other than the LED chip. As shown in FIG. 2, each of the LED chips 12 has a substantially square light emitting surface. Meanwhile, the light emitting surface of each of the LED chips 12 may have a shape other than the square, such as a rectangle, for example. Preferably, when a width in a left and right direction of a vehicle is set to 1, a light source image formed by light from each LED chip 12 is set in such a manner that its aspect ratio of the width in the upper and lower direction with respect to the width in the left and right direction is in the range of 0.5 or more but 1.5 or less, for example. Further, each LED chip 12 can be individually turned on and off in accordance with a control signal from a control unit 30.

As shown in FIG. 1, the projection lens 20 is, for example, a piano-convex lens and has a planar incidence surface 20a and a convex emission surface 20b. The incidence surface 20a faces the LED chips 12, and the emission surface 20b faces the front of the lamp. The projection lens 20 is disposed in such a manner that a rear focal point f m ere an optical axis Ax and a rear focal plane fp intersect is positioned in the vicinity of the lowermost LED chip 12d among the plurality of LED chips 12. Meanwhile, the optical axis Ax of the projection lens 20 is preferably oriented in such a direction that the light transmitted through the projection lens 20 irradiates a predetermined range of road surface in front of the lamp.

The substrate 11 is disposed to be inclined along an upper and lower direction D passing through the rear focal point f of the projection lens 20 and orthogonal to the optical axis Ax. That is, the substrate 11 is inclined in the upper and lower direction D such that the chip mounting surface 11a is inclined with respect to the incidence surface 20a of the projection lens 20, more specifically, the upper side of the chip mounting surface 11a is separated from the rear focal point f of the projection lens 20. In this way, the plurality of LED chips 12 are arranged in an inclined manner such that light emitting surfaces 12P thereof are farther separated to the rear side of the lamp than the rear focal point f from the LED chip 12d disposed in the vicinity of the rear focal point f toward the LED chips 12c, 12b, 12a on the upward direction side thereof.

Light emitted from each of the LED chips 12a to 12d is incident on the incidence surface 20a of the projection lens 20 and is emitted from the emission surface 20b. At this time, light La from the LED chip 12a disposed on the upper side of the substrate 11 is irradiated to the vicinity of the front of the lamp, and light (e.g., light Lb and light Lc) from the LED chips 12b to 12d disposed below the LED chip 12a is irradiated to the farther side in font of the lamp than the light La from the LED chip 12a. Meanwhile, by forming predetermined steps on the incidence surface 20a or the emission surface 20b of the projection lens 20, the light from each of the LED chips 12a to 12d may be refracted to be diffused in the upper and lower direction with respect to the optical axis Ax.

The turning on/off of each of the LED chips 12a to 12d, and the emission intensity adjustment and blink rate adjustment of the light from each of the LED chips 12a to 12d are performed by the control unit 30. In this way, the control unit 30 can change the individual turning on/off of each of the LED chips 12a to 12d and change the luminous intensity and blink rate of each of the LED chips 12a to 12d. The control unit 30 is realized by elements or circuits such as a CPU and a storage unit of a computer as a hardware configuration and realized by a computer program or the like as a software configuration. Meanwhile, although the control unit 30 is provided outside the lamp chamber 3 in FIG. 1, the control unit 30 may be provided in the lamp chamber 3. The control unit 30 receives a signal from a lamp switch or the like (not shown) and transmits various control signals to the LED chips 12a to 12d in accordance with the received signal.

Figure 3:
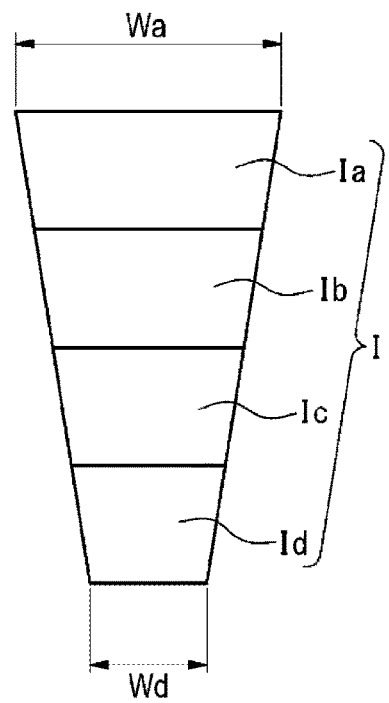
FIG. 3 is a view for explaining an example of a light source image which is formed on a focal plane of a projection lens by the light source according to the first embodiment.
Figure 4:
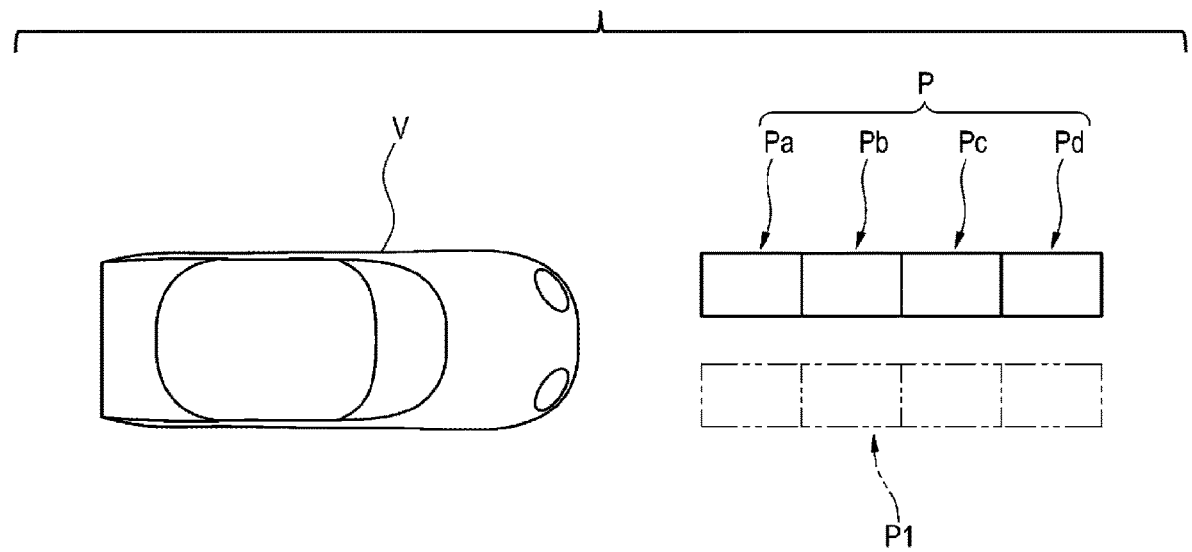
FIG. 4 is a view for explaining an example of a light distribution pattern which is projected on a road surface by using the vehicle lamp according to the first embodiment.

FIG. 3 is a view for explaining an example of a light source image which is formed on a focal plane of the projection lens 20 by the plurality of LED chips 12 according to the first embodiment, and FIG. 4 is a view for explaining an example of a light distribution pattern which is projected by using the light source 10 and the projection lens 20 according to the first embodiment.

The light emitted from each of the LED chips 12a to 12d forms a light source image I which is longer in the upper and lower direction than the left and right direction as shown in FIG. 3 on a focal plane fp of the projection lens 20 shown in FIG. 1. The light source image I is configured by light source images Ia to Id formed by each of the LED chips 12a to 12d. As described above, the plurality of LED chips 12 are arranged in an inclined manner so as to be farther separated to the rear side of the lamp than the rear focal point f as they go from the LED chip 12d disposed in the vicinity of the rear focal point f toward the LED chips 12c, 12b, 12a on the upward direction side thereof. Therefore, the width in the left and right direction of the light source images Ia to Id on the focal plane fp of each of the LED chips 12a to 12d is widened as it goes from the lowermost light source image Id to the upper light source image Ia (that is, a width Wa of the uppermost portion of the light source image I>a width Wd of the lowermost portion of the light source image I).

When such light source images Ia to Id are transmitted through the projection lens 20 and projected on the road surface, light distribution patterns Pa to Pd shown in FIG. 4 are formed, respectively. The light source image Ia of the uppermost LED chip 12a forms the light distribution pattern Pa closest to the vehicle V, and the light source image Ib of the LED chip 12b disposed below the LED chip 12a forms the light distribution pattern Pb arranged farther than the light distribution pattern Pa so as to be in contact with the light distribution pattern Pa. Further, the light source image Ic of the LED chip 12c disposed below the LED chip 12b forms the light distribution pattern Pc arranged farther than the light distribution pattern Pb so as to be in contact with the light distribution pattern Pb, and the light source image Id of the lowermost LED chip 12d forms the light distribution pattern Pd arranged farthest from the vehicle V so as to be in contact with the light distribution pattern Pc. These light distribution patterns Pa to Pd form a linear light distribution pattern P extending largely in the front and rear direction of the vehicle V than the left and right direction of the vehicle V.

When the light emitting surface of each of the plurality of LED chips is disposed so as to be positioned on the rear focal plane of the projection lens as in the above-described Patent Document 1, the irradiation width of the light distribution pattern is widened from the vicinity toward a place distant from the vehicle. On the contrary, in the present embodiment, since the widths of the light source images Ia to Id formed on the focal plane fp by each of the LED chips 12a to 12d are widened from the lowermost light source image Id toward the upper light source image Ia, the linear light distribution pattern P has a substantially uniform width in any region in the front and rear direction of the vehicle V, as shown in FIG. 4. Therefore, in the present embodiment, it is possible to obtain the linear light distribution pattern P having a uniform irradiation width from the vicinity toward a place distant from the vehicle V. Meanwhile, in order to obtain the linear light distribution pattern P having a uniform irradiation width, the LED chips 12a to 12d are preferably arranged in an inclined manner such that the product of the width (e.g., the width Wa and the width Wb in FIG. 3) in the left and right direction of the light source image I and the distance from the vehicle V to the linear light distribution pattern P is constant in any region in the upper and lower direction of the light source image I. Further, preferably, when the width in the left and right direction of the vehicle is set to 1, the linear light distribution pattern P formed from the light distribution patterns Pa to Pd forms a pattern in which an aspect ratio of the width in the front and rear direction of the vehicle with respect to the width in the left and right direction of the vehicle is four or more. In this way, it is possible to irradiate a range from 10 m to the 100 m in front of the vehicle as a drawing mark (line).

Meanwhile, although the light distribution patterns Pa to Pd in a state where all of the LED chips 12a to 12d are turned on are shown in FIG. 4, the LED chips 12a to 12d may be sequentially turned on in accordance with the turn on/off control signal from the control unit 30, for example. Further, although the linear light distribution pattern P formed by the vehicle lamp 1 mounted on the left headlamp of the vehicle V is shown in FIG. 4, two parallel lines along the vehicle width of the vehicle V can be drawn on the road surface by further mounting the vehicle lamp 1 on the right headlamp of the vehicle V and forming a linear light distribution pattern P1 indicated by a broken line.

As described above, in the present embodiment, the vehicle lamp 1 includes the light source 10 for road surface drawing capable of forming the light source image I longer in the upper and lower direction than the left and right direction of the vehicle lamp 1, and the projection lens 20 through which the light forming the light source image I of the light source 10 is transmitted and which projects a predetermined light distribution pattern P on the road surface. The light emitting surface 12P of the light source 10 is disposed in the vicinity of the rear focal point f of the projection lens 20, and the light emitting surface 12P is inclined with respect to the upper and lower direction D orthogonal to the optical axis Ax of the projection lens 20. Specifically, the light source 10 includes the plurality of LED chips 12 which are disposed in the vicinity of the rear focal point f of the projection lens 20 and arranged so as to be able to form a light source image extending upward from the side of the optical axis Ax of the projection lens 20. The plurality of LED chips 12 can be individually turned on and off. The plurality of LED chips 12 are arranged in an inclined manner so as to be farther separated to the rear side than the rear focal point f as they go from the LED chip 12d disposed in the vicinity of the rear focal point f of the projection lens 20 toward the LED chips 12c, 12b, 12a on the upward direction side thereof. According to this configuration, for example, when drawing two linear light distribution patterns P P1 extending largely in the front and rear direction more than the left and right direction of the vehicle V on the road surface as parallel lines along the vehicle width, it is possible to irradiate a pattern having a uniform irradiation width from the vicinity to a place distant from the vehicle V. Furthermore, for example, by sequentially turning on the plurality of LED chips 12 from the LED chip 12a irradiating the vicinity of the vehicle V toward the LED chip 12d irradiating a place distant from the vehicle V, the light distribution patterns Pa to Pd can be sequentially drawn on the road surface from the vicinity to the place distant from the vehicle.

Further, since the luminous intensity of each LED chip 12 is made variable in accordance with the control signal from the control unit 30, the luminous intensity of the LED chips 12a to 12d may be changed in accordance with the distance from the vehicle V to the respective light distribution patterns Pa to Pd, for example. When the luminous intensities of the LED chips 12a to 12d are the same, the light distribution pattern Pa in the vicinity of the vehicle is irradiated brighter than the light distribution pattern Pd in the distant place. However, by increasing the luminous intensity of the LED chip irradiating the distant place greater than that of the LED chip irradiating the vicinity, the illuminance of the linear light distribution pattern P formed from the light distribution patterns Pa to Pd can be made uniform from the vicinity to the distant place.

Meanwhile, the vehicle lamp 1 may include a swivel mechanism for turning a light distribution direction of the vehicle lamp 1 leftward and rightward. The swivel mechanism may be configured such that the light distribution direction (the direction of the optical axis Ax of the projection lens 20) is moved leftward and rightward when the vehicle lamp 1 is mechanically turned by the swivel mechanism. In this way, the irradiation direction of the light forming the linear light distribution pattern P can be arbitrarily changed. For example, it is possible to detect an object such as a pedestrian and draw the linear light distribution pattern P on the road surface toward the direction of the detected object.

(Modification 1)

Figure 5:
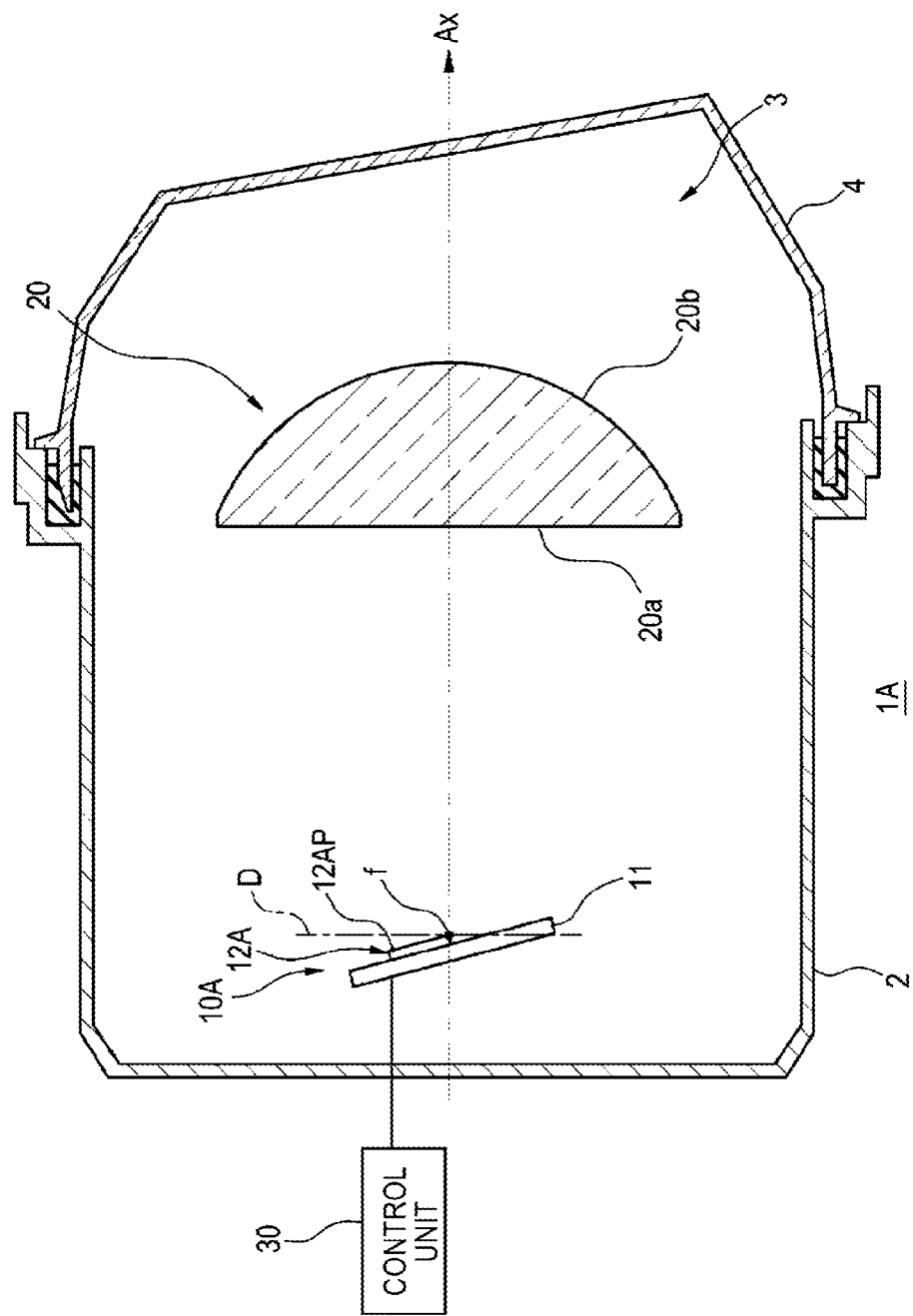
FIG. 5 is a vertical sectional view showing a schematic structure of a vehicle lamp according to a modification (modification 1) of the first embodiment.

FIG. 5 is a vertical sectional view showing a vehicle lamp according to a modification (modification 1) of the present embodiment.

Instead of the configuration in which a plurality of LED chips 12 are arranged in parallel in a longitudinal direction on the substrate 11 as in the first embodiment, a vehicle lamp 1A of the modification 1 includes a single LED chip 12A which is elongated in the longitudinal direction and capable of forming a light source image extending upward from the side of the optical axis Ax of the projection lens 20. The LED chip 12A is disposed such that its lower end side is positioned in the vicinity of the rear focal point f of the projection lens 20. As shown in FIG. 5, also in the modification 1, the substrate 11 is disposed to be inclined along the upper and lower direction D orthogonal to the optical axis Ax of the projection lens 20. The LED chip 12A is inclined to be farther separated to the rear side than the rear focal point f of the projection lens 20 as it goes toward the upward direction. According to this configuration, similar to the first embodiment, the light source image I (see FIG. 3) in which the width is widened as it goes from the lower side toward the upper side can be formed on the focal plane fp (see FIG. 1) of the projection lens 20, and the linear light distribution pattern P (see FIG. 4) having a uniform irradiation width from the vicinity to a place distant from the vehicle V can be drawn on the road surface.

(Modification 2)

Figure 6:
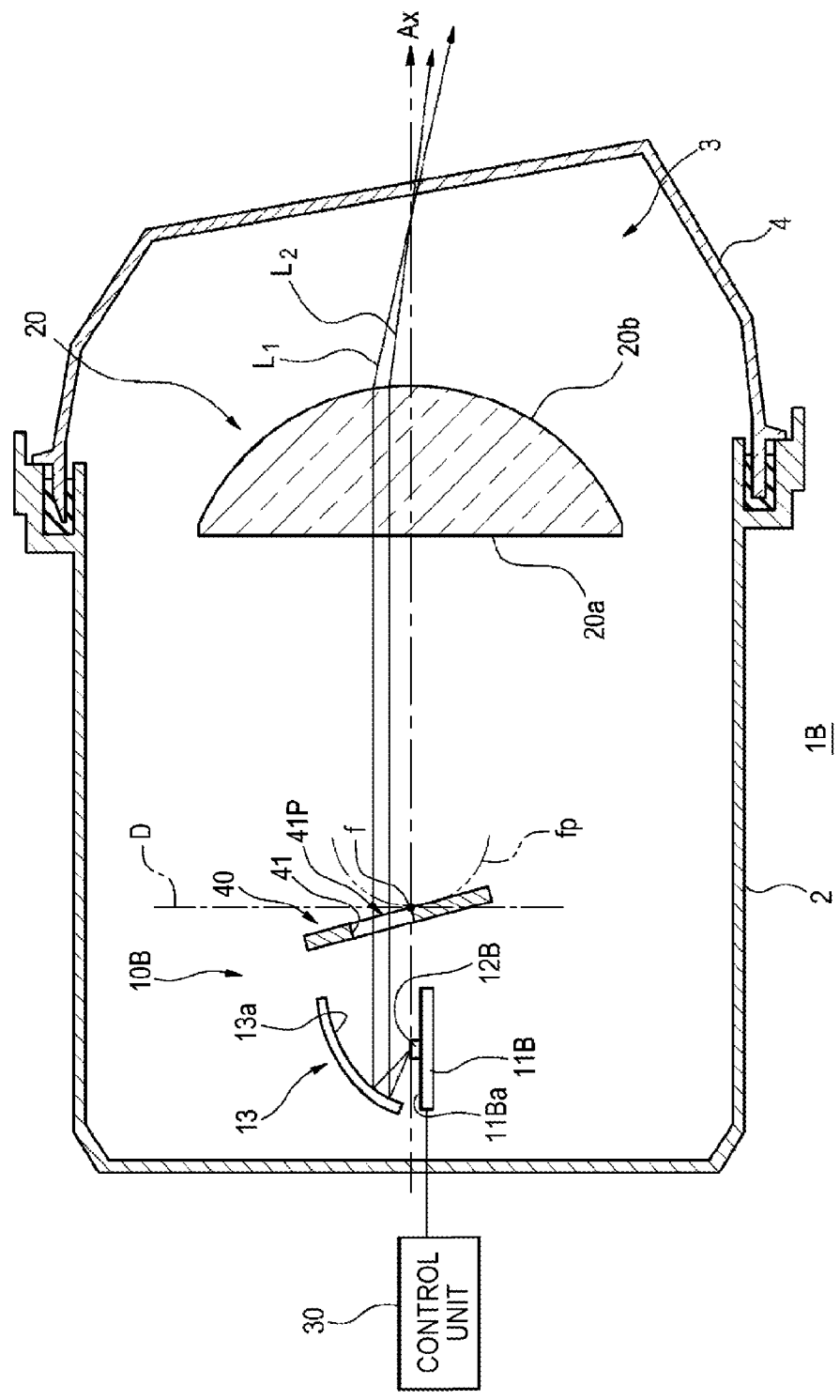
FIG. 6 is a vertical sectional view showing a schematic structure of a vehicle lamp according to another modification (modification 2) of the first embodiment.
Figure 7:
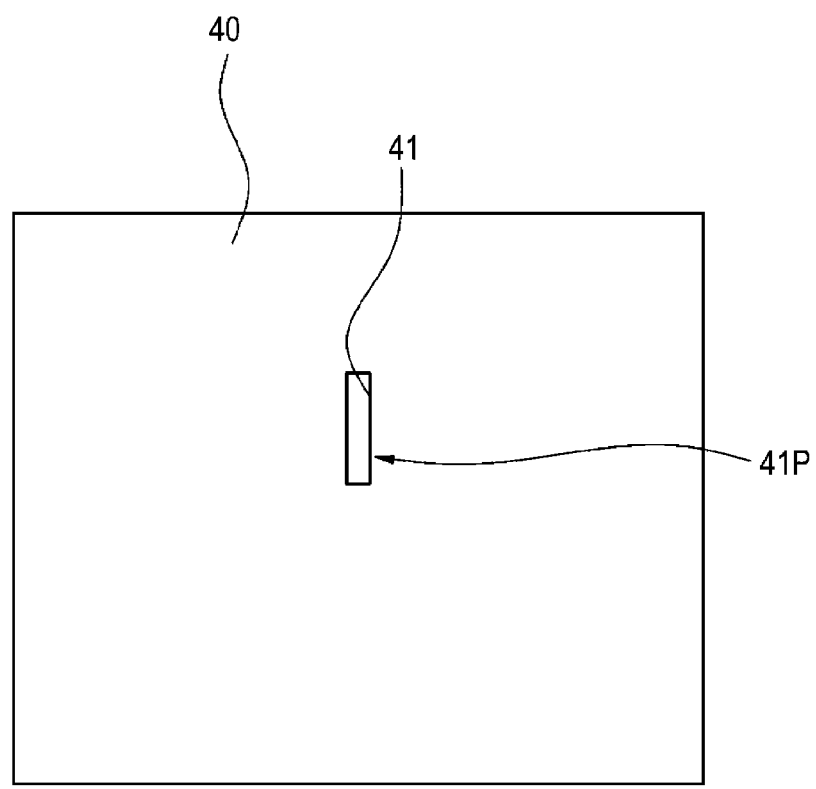
FIG. 7 is a front view of a light shielding member according to the modification 2 shown in FIG. 6.

FIG. 6 is a vertical sectional view showing a vehicle lamp according to a modification (modification 2) of the present embodiment, and FIG. 7 is a front view of a light shielding member according to the modification 2 shown in FIG. 6.

A vehicle lamp 1B of the modification 2 includes a light source unit 10B and the projection lens 20. The light source unit 10B includes a substrate 11B, at least one LED chip 12B mounted on the substrate 11B, a reflector 13, and a light shielding member 40. The substrate 11B is disposed so that its chip mounting surface 11Ba is provided along the optical axis Ax of the projection lens 20. The reflector 13 is disposed above the substrate 11B and has an elliptical reflecting surface 13a for reflecting light emitted from the LED chip 12B toward the projection lens 20.

The light shielding member 40 is a member for shieling a part of light emitted from the LED chip 12B and reflected by the elliptical reflecting surface 13a of the reflector 13. As shown in FIGS. 6 and 7, the light shielding member 40 has a light transmitting portion 41 through which the other part of the light reflected by the elliptical reflecting surface 13a of the reflector 13 is transmitted. The light transmitting portion 41 is, for example, an opening portion, and a lower end of the light transmitting portion 41 is disposed at the rear focal point f of the projection lens 20. The light transmitting portion 41 is opened in a substantially uniform width so as to extend upward from the side of the optical axis Ax of the projection lens 20. Preferably, when the width in the left and right direction of the lamp is set to 1, the light transmitting portion 41 is set in such a manner that its aspect ratio of the width in the upper and lower direction with respect to the width in the left and right direction is four or more. The light shielding member 40 is disposed so that a light transmitting surface 41P of the light transmitting portion 41 is inclined along the upper and lower direction D orthogonal to the optical axis Ax of the projection lens 20. That is, the light transmitting portion 41 is inclined to be farther separated to the rear side than the rear focal point f of the projection lens 20 as it goes toward the upward direction. Meanwhile, the light transmitting portion 41 is not limited to the opening portion, but may be a transparent glass or a transparent resin or the like for allowing transmission of light.

In such vehicle lamp 1B, light L1, L2 emitted from the LED chip 12B and transmitted through the light transmitting portion 41 of the light shielding member 40 forms a light source image longer in the upper and lower direction than the left and right direction of the lamp on the focal plane fp of the projection lens 20. Further, the light transmitting surface 41P of the light shielding member 40 is inclined to be farther separated to the rear side than the rear focal point f as it goes toward the upward direction. Therefore, also in the modification 2, similar to the first embodiment, the light source image I (see FIG. 3) in which the width is widened from the lower side toward the upper side can be formed on the focal plane fp (see FIG. 1) of the projection lens 20, and the linear light distribution pattern P (see FIG. 4) having a uniform irradiation width from the vicinity to a place distant from the vehicle V can be drawn on the road surface.

Meanwhile, in the modification 2, the light source unit 10B includes at least one LED chip 12B, but the disclosure is not limited thereto. For example, a plurality of LED chips may be closely arranged along the front and rear direction of the lamp on the substrate 11. Further in addition to the LED chip 12, a light source bulb may be used as the light source. For example, the light source bulb is configured by an incandescent lamp having a filament, such as a halogen lamp. The light source bulb is formed in a cup shape and includes a reflector having an insertion hole at the center thereof. The halogen lamp is inserted through the insertion hole. In the case of using the light source bulb, the light from the light source bulb is reflected forward by the reflector, and only the light transmitted through the light transmitting portion 41 of the light shielding member 40 is irradiated forward through the projection lens 20. Meanwhile, another type of light source such as a discharge lamp may be adopted as the light source bulb.

Further, the light emitting surface of at least one LED chip 12 may be disposed so as to face the incidence surface 20a of the projection lens 20 without providing the reflector 13, so that the light from the LED chip 12 may be directly emitted toward the light shielding member 40.

Second Embodiment

Figure 8:
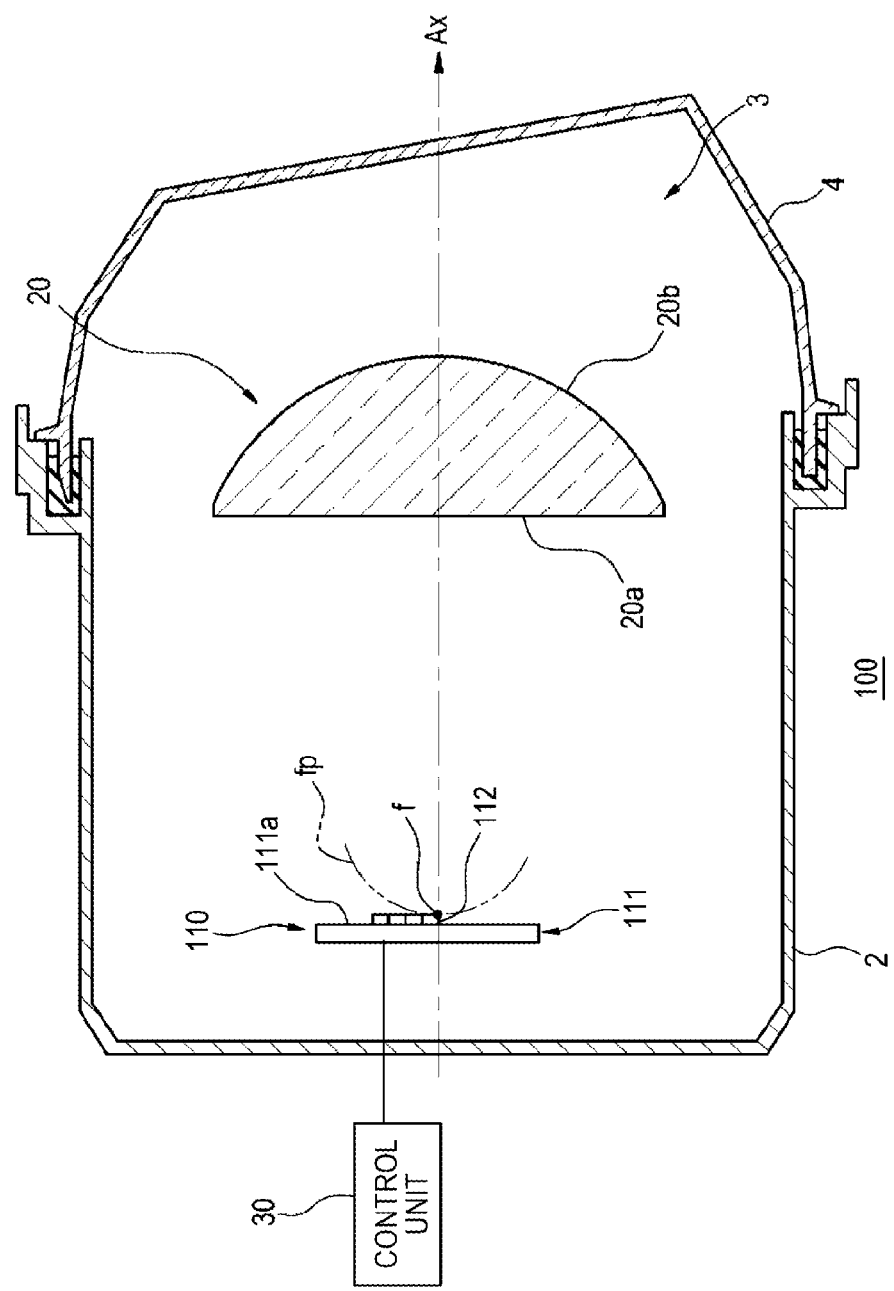
FIG. 8 is a vertical sectional view showing a schematic structure of a vehicle lamp according to a second embodiment of the disclosure.
Figure 9:
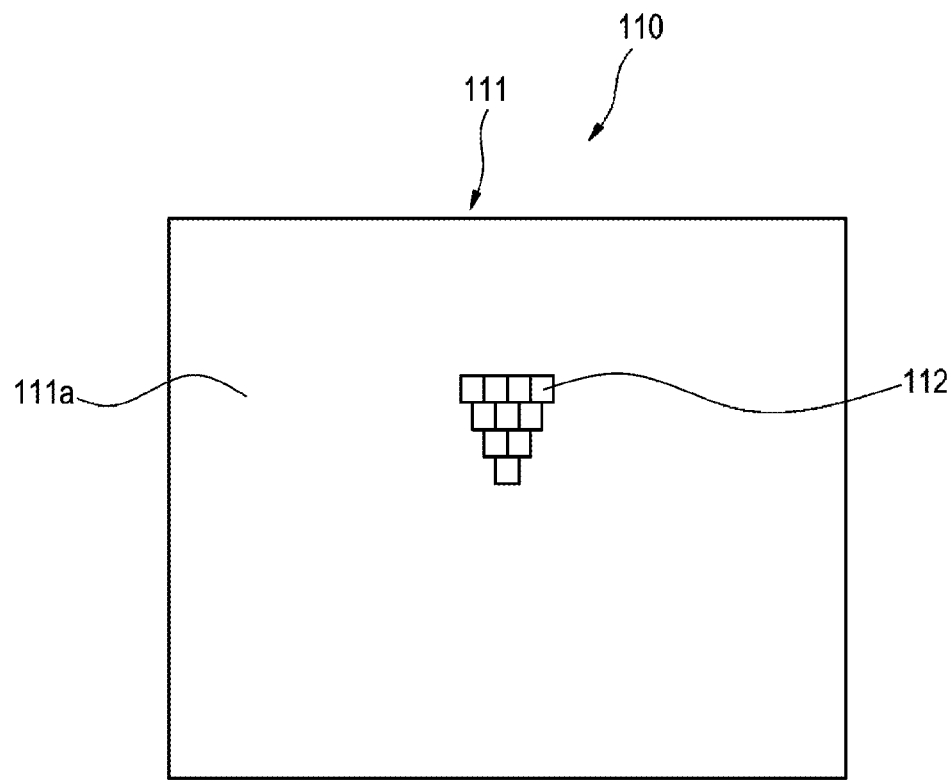
FIG. 9 is a front view of a light source according to the second embodiment.

FIG. 8 is a vertical sectional view showing a vehicle lamp according to a second embodiment, and FIG. 9 is a font view of a light source according to the second embodiment.

A vehicle lamp 100 of the second embodiment includes a light source 110 and the projection lens 20 in the lamp chamber 3 which is defined by the lamp body 2 and the translucent cover 4. The light source 110 includes a substrate 111 and a plurality of LED chips 112 mounted on the substrate 111. The substrate 111 is disposed such that its chip mounting surface 111a is substantially parallel to the incidence surface 20a of the projection lens 20.

As shown in FIGS. 8 and 9, a plurality of (ten in this example) LED chips 112 are closely arranged on the substrate 111. For example, one LED chip 112 is arranged in the vicinity of the rear focal point f of the projection lens 20, two LED chips 112 are arranged in the upper row, three LED chips 112 are arranged in the next upper row, and four LED chips 112 are arranged in the uppermost row. Each LED chip 112 can be individually turned on and off in accordance with the control signal from the control unit 30. When the width in the left and right direction of the vehicle is set to 1, the light source image formed by the light from each LED chip 112 is set in such a manner that its aspect ratio of the width in the upper and lower direction with respect to the width in the left and right direction is in the range of 0.5 or more but 1.5 or less, for example.

In the vehicle lamp 100 having such a configuration, the light emitted from all of the LED chips 112 forms, on the focal plane fp of the projection lens 20, a light source image which is longer in the upper and lower direction than the left and right direction and in which the width in the left and right direction is widened as it goes from the lower side toward the upper side (that is, the width is not uniform).

As described above, the vehicle lamp 100 according to the present embodiment includes the light source 110 for road surface drawing capable of forming a light source image having a non-uniform width, and the projection lens 20 through which the light forming the light source image is transmitted and which projects a predetermined light distribution patter on the road surface. Of the light source image within the focal plane fp of the projection lens 20, the region of the part projected on the place distant from the vehicle is made narrower than the region of the part projected on the vicinity of the vehicle. Specifically, the light source 110 includes the plurality of LED chips 112 which are disposed in the vicinity of the rear focal point f of the projection lens 20 and arranged so as to be able to form a light source image extending upward from the side of the optical axis Ax of the projection lens 20. The plurality of LED chips 112 can be individually turned on and off. The plurality of LED chips 112 are arranged such that the number thereof increases as they go from the LED chip 112 disposed in the vicinity of the rear focal point f of the projection lens 20 toward the LED chips 112 on the upward direction side thereof. According to this configuration, for example, when detecting an object such as a pedestrian and drawing the linear light distribution pattern P (see FIG. 4) extending largely in the front and rear direction more than the left and right direction of the vehicle V on the road surface toward the direction of the detected object, it is possible to irradiate a pattern having a substantially uniform irradiation width from the vicinity to a place distant from the vehicle V. Further, for example, by sequentially turning on the plurality of LED chips 112 from the LED chips 112 in the uppermost row irradiating the vicinity of the vehicle V, the light distribution patterns Pa to Pd can be sequentially drawn on the road surface from the vicinity toward the place distant from the vehicle toward the direction of the object such as the pedestrian.

Further, by varying the luminous intensity of the LED chips 112 according to the distance from the vehicle V to the light distribution patterns Pa to Pd by the control signal from the control unit 30, specifically, by increasing the luminous intensity of the LED chip 112 irradiating the distant place greater than that of the LED chip 112 irradiating the vicinity, the illuminance of the linear light distribution pattern P formed from the light distribution patterns Pa to Pd can be made uniform from the vicinity to the distant place.

(Modification 3)

Figure 10:
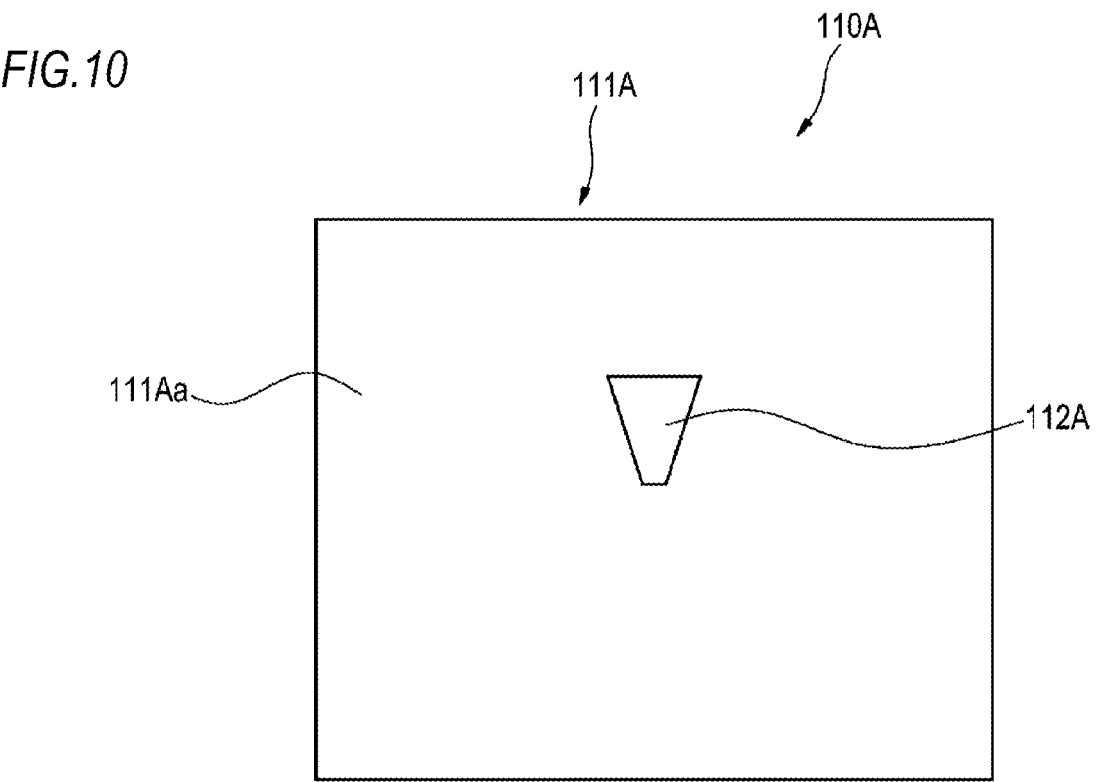
FIG. 10 is a front view of a light source according to a modification (modification 3) of the second embodiment.

FIG. 10 is a vertical sectional view showing a vehicle lamp according to a modification (modification 3) of the present embodiment.

Instead of the configuration in which a plurality of LED chips 112 are arranged on the substrate 111 as in the second embodiment, a vehicle lamp of the modification 3 includes a single LED chip 112A capable of forming a light source image extending upward from the side of the optical axis Ax of the projection lens 20. The LED chip 112A is disposed such that its lower end side is positioned in the vicinity of the rear focal point f of the projection lens 20. The width in the left and right direction of the LED chip 112A is made thicker as it goes from the vicinity of the rear focal point f toward the upper side. Even by using such vertically elongated trapezoidal LED chip 112A, it is possible to form, on the focal plane fp of the projection lens 20, the light source image I (see FIG. 3) in which the width is not uniform, that is, the width is widened from the lower side toward the upper side. In particular, in the case of using the vertically elongated trapezoidal LED chip 112A as in the modification 3, it is possible to form a light source image having straight side edges, unlike the case where a plurality of rectangular LED chips 112 are arranged in a stepwise manner as in the second embodiment. By transmitting this light source image through the projection lens 20 and irradiating it in front of the lamp, the linear light distribution pattern P (see FIG. 4) having a more uniform irradiation width from the vicinity to a place distant from the vehicle V can be drawn on the road surface.

(Modification 4)

Figure 11:
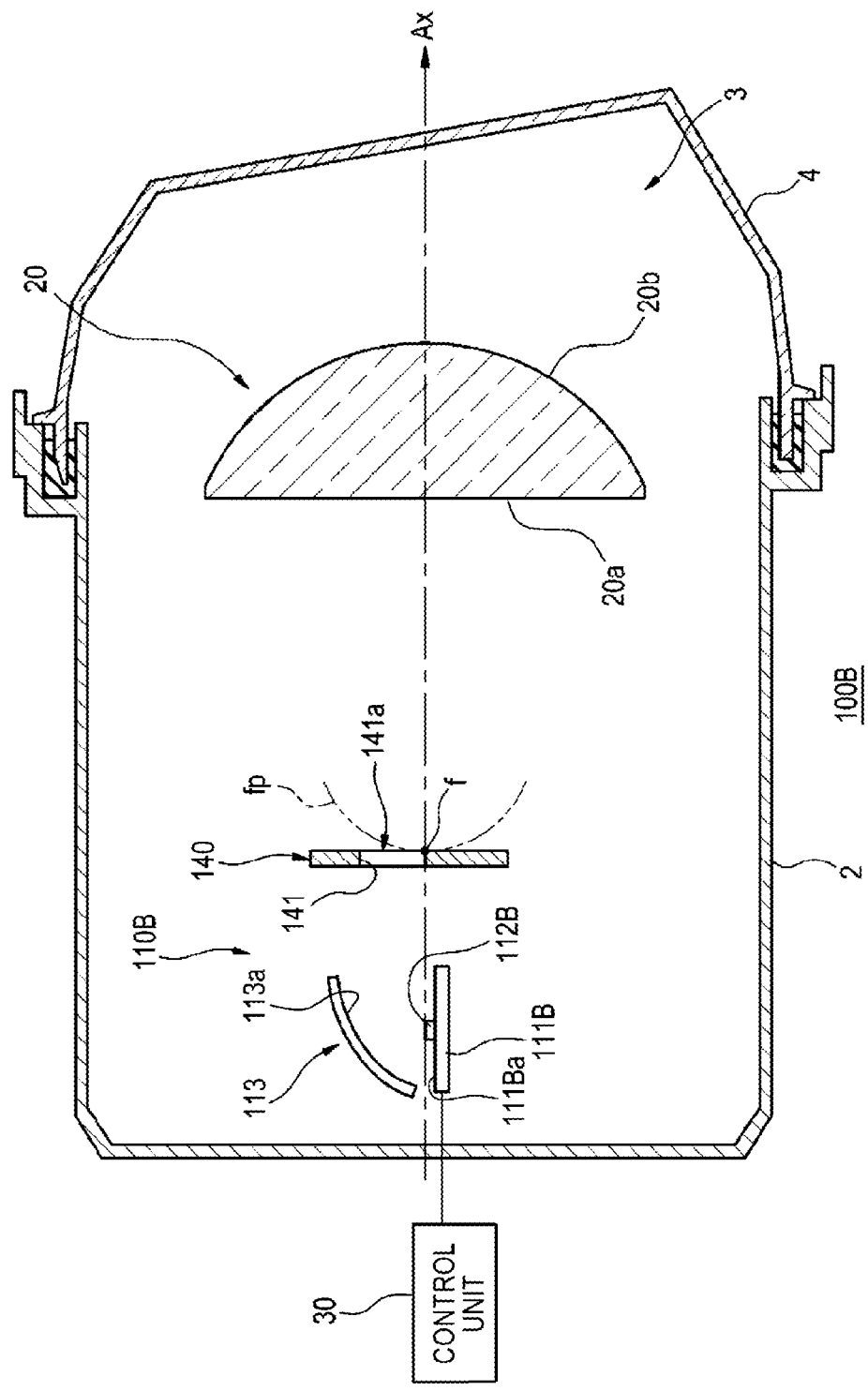
FIG. 11 is a vertical sectional view showing a schematic structure of a vehicle lamp according to another modification (modification 4) of the second embodiment.
Figure 12:
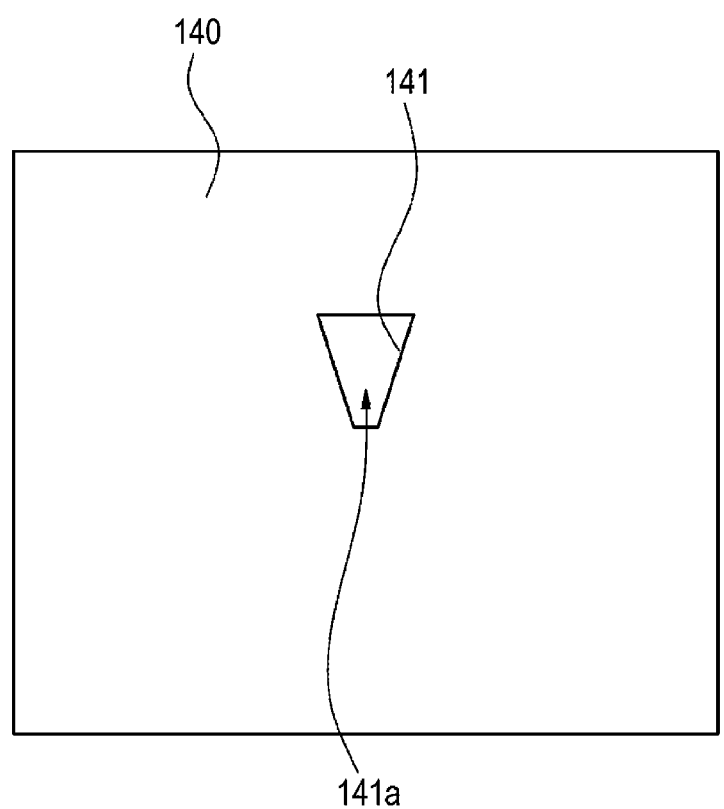
FIG. 12 is a front view of a light shielding member according to the modification 4 shown in FIG. 11.

FIG. 11 is a vertical sectional view showing a vehicle lamp according to a modification (modification 4) of the present embodiment, and FIG. 12 is a front view of a light shielding member according to the modification 4 shown in FIG. 11.

Similar to the vehicle lamp 1B of the modification 2, a vehicle lamp 100B of the modification 4 includes a light source unit 110B and the projection lens 20. The light source unit 110B includes the substrate 111B, at least one LED chip 112B mounted on the substrate 111B, a reflector 113, and a light shielding member 140. The substrate 111B is disposed so that its chip mounting surface 111Ba is provided along the optical axis Ax of the projection lens 20. The reflector 113 is disposed above the substrate 111B and has an elliptical reflecting surface 113a for reflecting light emitted from the LED chip 112B toward the projection lens 20.

The light shielding member 140 is a member for shieling a part of light emitted from the LED chip 112B and reflected by the elliptical reflecting surface 113a of the reflector 113. As shown in FIGS. 11 and 12, the light shielding member 140 has a light transmitting portion 141 through which the other part of the light reflected by the elliptical reflecting surface 113a of the reflector 113 is transmitted. The light transmitting portion 141 is, for example, an opening portion, and a lower end of the light transmitting portion 141 is disposed at the rear focal point f of the projection lens 20. The width in the left and right direction of the light transmitting portion 141 is gradually made thicker as it goes from the rear focal point f of the projection lens 20 toward the upper side. The light shielding member 140 is disposed such that a light transmitting surface 141a of the light transmitting portion 141 is substantially parallel to the incidence surface 20a of the projection lens 20. Meanwhile, the light transmitting portion 141 is not limited to the opening portion, but may be a transparent glass or a transparent resin or the like for allowing transmission of light.

In such vehicle lamp 100B, light emitted from the LED chip 112B and transmitted through the light transmitting portion 141 of the light shielding member 140 forms a light source image longer in the upper and lower direction than the left and right direction of the lamp on the focal plane fp of the projection lens 20. Further the width in the left and right direction of the light transmitting portion 141 of the light shielding member 140 is gradually made thicker as it goes from the rear focal point f of the projection lens 20 toward the upper side. Therefore, also in the present modification, similar to the modification 3, it is possible to form, on the focal plane fp of the projection lens 20, the light source image I (see FIG. 3) in which the width is not uniform, that is, the width in the left and right direction is widened as it goes from the lower side toward the upper side. The light source image I has straight side edges. By transmitting this light source image I through the projection lens and irradiating it in front of the lamp, similar to the modification 3, the linear light distribution pattern P (see FIG. 4) having a uniform irradiation width from the vicinity to a place distant from the vehicle V can be drawn on the road surface.

Meanwhile, also in the modification 4, similar to the modification 2, a plurality of LED chips 12 closely arranged along the upper and lower direction as shown in FIG. 2 may be used as the light source, or a light source bulb such as a halogen lamp or a discharge lamp may be used as the light source.

Hereinafter, an example of a third embodiment of the disclosure will be described in detail with reference to the drawings.

Third Embodiment

Figure 13:
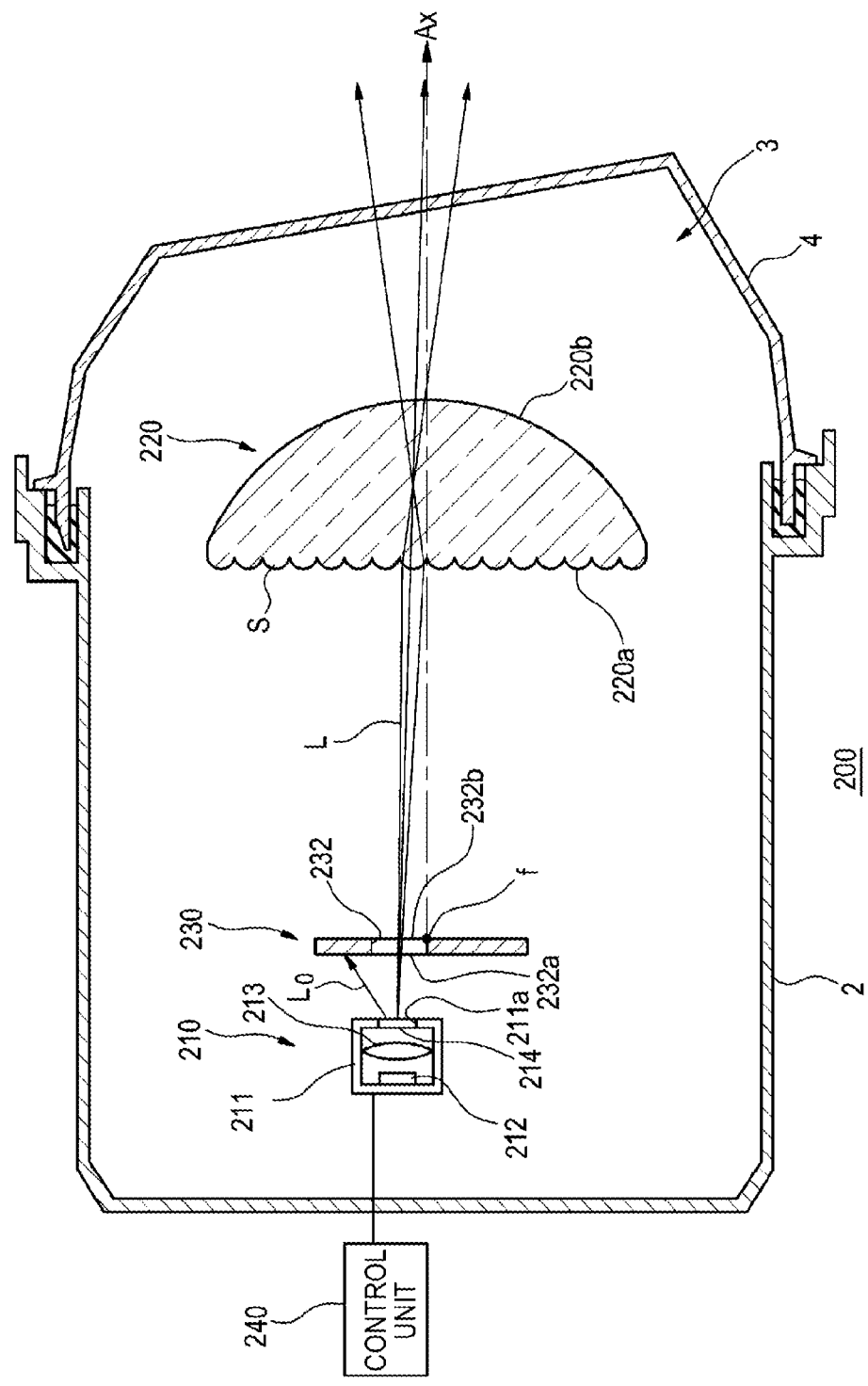
FIG. 13 is a vertical sectional view showing a schematic structure of a vehicle lamp according to a third embodiment of the disclosure.
Figure 14:
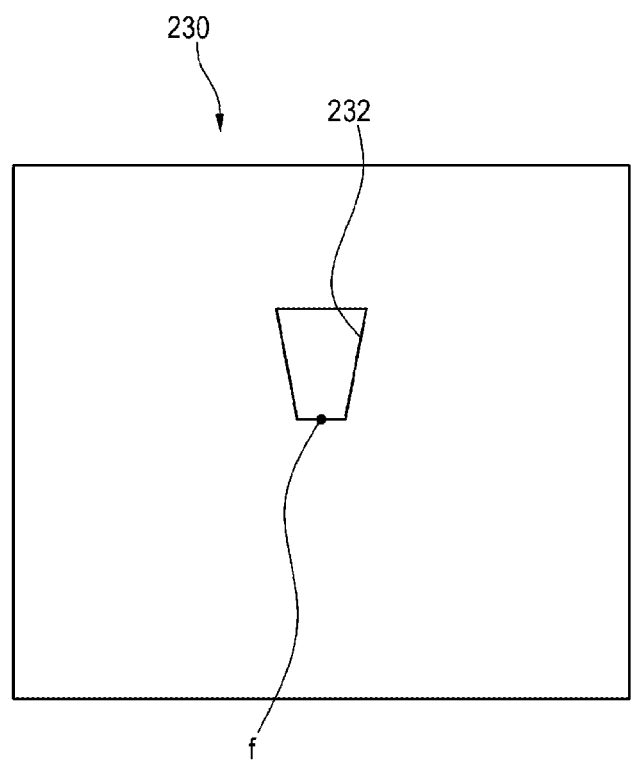
FIG. 14 is a front view of a light shielding member according to the third embodiment.

FIG. 13 is a vertical sectional view showing a schematic structure of a vehicle lamp according to the third embodiment of the disclosure, and FIG. 14 is a front view of a light shielding member according to the present embodiment.

A vehicle lamp 200 (hereinafter, referred to as "lamp 200") according to the present embodiment is a road surface drawing lamp unit (road surface drawing device) mounted on at least one of a pair of headlamps arranged on the left and right in front of a vehicle. FIG. 13 shows a structure of the road surface drawing lamp unit mounted on one of the headlamps as the lamp 200.

As shown in FIG. 13, the lamp 200 includes the lamp body 2 having an opening portion on the vehicle front side, and the translucent cover 4 attached so as to cover the opening portion of the lamp body 2. The translucent cover 4 is formed of a light-transmitting resin, glass or the like. A laser light source 210, a projection lens 220, and a light shielding member 230 (an example of an optical member) are accommodated in the lamp chamber 3 which is defined by the lamp body 2 and the translucent cover 4. Each component is attached to the lamp body 2 by a support mechanism (not shown).

The laser light source 210 includes a housing 211, a laser chip 212, a condenser lens 213, and a phosphor 214. The laser chip 212 is placed in the housing 211 and is configured by arranging one or more white LDs, for example. The condenser lens 213 is accommodated in the housing 211 and is configured by, for example, a biconvex lens for condensing laser light emitted from the laser chip 212. A penetrating portion 211a is formed at a position of the housing 211 facing an emission surface of the condenser lens 213. The phosphor 214 is provided in the penetrating portion 211a. As the phosphor 214, for example, one in which fluorescent substance is dispersed in a transparent sealing member, or a plate-like phosphor ceramic or the like is used. In the laser light source 210 having such a configuration, light from the laser chip 212 is transmitted through the condenser lens 213 and emitted toward the phosphor 214. Then, the phosphor 214 is excited and emitted, so that the light is irradiated toward the projection lens 220. At this time, since the light condensed by the condenser lens 213 is incident on the phosphor 214, a light source image formed by the light generated by the excitation and emission of the phosphor 214 may be made in such a manner that the luminance at the peripheral portion thereof is smaller than the luminance at the central portion, that is, the luminance becomes uneven.

As shown in FIG. 13, the projection lens 220 has an incidence surface 220a and a convex emission surface 220b. The incidence surface 220a is disposed so as to face the phosphor 214 of the laser light source 210 with the light shielding member 230 (to be described below) therebetween, and the emission surface 220b is oriented toward the front of the lamp. The optical axis Ax of the projection lens 220 is preferably oriented in such a direction that the light transmitted through the projection lens 220 irradiates a predetermined range of road surface in front of the lamp. In order to obtain a desired light distribution pattern, a plurality of cylindrical diffusion steps S arranged in parallel along the upper and lower direction of the lamp are formed on the incidence surface 220 of the projection lens 220. The diffusion steps S may be formed on the side of the emission surface 220b of the projection lens 220. In this way, the light incident on the projection lens 220 can be diffused in the upper and lower direction. Meanwhile, the diffusion step is not limited to the cylindrical shape, but may be a continuous tangential shape step (irregular shape having tangent continuity) or a continuous curvature shape step (irregular shape having curvature continuity). Further, the diffusion step is not limited to the curved surface, but may have a triangular shape or the like.

As shown in FIGS. 13 and 14, the light shielding member 230 is a flat plate-like member disposed between the laser light source 210 and the projection lens 220. The light shielding member 230 is disposed along a plane orthogonal to the optical axis Ax of the projection lens 220. The central portion of the light shielding member 230 substantially coincides with the rear focal point f of the projection lens 220. On the upper side of the central portion of the light shielding member 230, an opening portion 232 is formed at a position facing the phosphor 214 of the laser light source 210. A part of light generated from the phosphor 214 can pass through the opening portion 232. Meanwhile, a light-transmitting transparent glass or transparent resin or the like may be disposed in the opening portion 232 of the light shielding member 230 to constitute the light transmitting portion. Further, in the present embodiment, the opening portion 232 is formed in a trapezoidal shape having the upper side wider than the lower side. Since the opening portion 232 is opened in such a trapezoidal shape, the light passing through the opening portion 232 forms a trapezoidal light source image which is longer in the upper and lower direction than the left and right direction on an emission surface 232b of the opening portion 232 and in which the width in the left and right direction is widened as it goes from the lower side toward the upper side.

The turning on/off of the laser light source 210, and the emission intensity adjustment and blink rate adjustment of the light from the laser light source 210 are performed by a control unit 240. The control unit 240 is realized by elements or circuits such as a CPU and a storage unit of a computer as a hardware configuration and realized by a computer program or the like as a software configuration. Meanwhile, although the control unit 240 is provided outside the lamp chamber 3 in FIG. 13, the control unit 240 may be provided in the lamp chamber 3. The control unit 240 receives a signal from a lamp switch or the like (not shown) and transmits various control signals to the laser light source 210 in accordance with the received signal.

As shown in FIG. 13, a part of the light emitted from the laser light source 210 passes through the opening portion 232 of the light shielding member 230. As described above, the luminance of the light source image formed by the light generated from the phosphor 214 may be uneven in the central portion and the peripheral portion thereof. In the present embodiment, of the light forming such light source image, the light (e.g., light L in FIG. 13) constituting the peripheral portion of the light source image which tends to have low luminance is shielded by the light shielding member 230, and only the light constituting the central portion which tends to have high luminance is allowed to pass through the opening portion 232. In this way, a light source image formed on the emission surface 232b of the opening portion 232 has less luminance unevenness than an incidence surface 232a of the opening portion 232.

The light L passing through the opening portion 232 forms, on the emission surface 232b of the opening portion 232, a trapezoidal light source image in which the width in the left and right direction is widened as it goes from the lower side toward the upper side. Then, the trapezoidal light source image is incident on the incidence surface 220a of the projection lens 220 that is a plano-convex lens. The trapezoidal light source image is emitted in such a manner that it becomes substantially parallel light converging toward the optical axis Ax in the left and right direction and it becomes substantially diffused light spreading with respect to the optical axis Ax by the diffusion step S in the upper and lower direction. In this way, the light L emitted from the laser light source 210 is passed through the opening portion 232 of the light shielding member 230 and transmitted through the projection lens 220, so that a vertically elongated linear light distribution pattern (linear light distribution pattern P to be described below) longer in the upper and lower direction than the left and right direction is formed.

Figure 15:
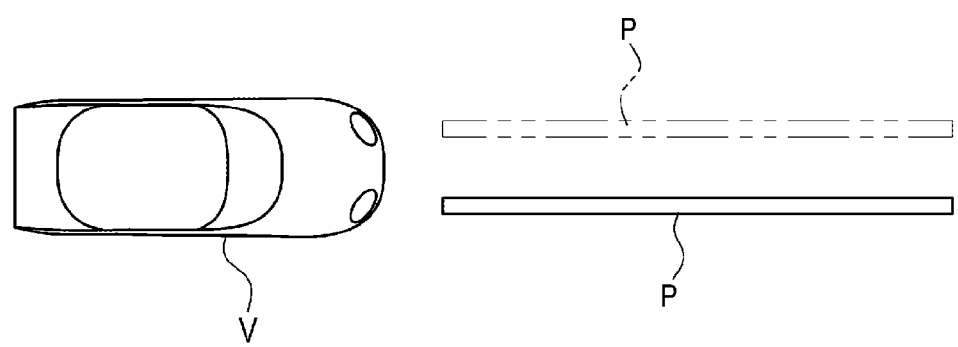
FIG. 15 is a view showing an example of a light distribution pattern which is formed by the vehicle lamp of the third embodiment.

FIG. 15 is a view showing an example of a light distribution pattern which is formed by the light irradiated from the lamp 200.

As described above, the light L emitted from the laser light source 210 is passed through the opening portion 232 of the light shielding member 230 and transmitted through the projection lens 220, so that the vertically elongated linear light distribution pattern P as shown in FIG. 15 is drawn on the road surface. For example, when the width in the left and right direction of the vehicle is set to 1, the linear light distribution pattern P drawn on the flat road surface is set such that the aspect ratio of the width in the front and rear direction with respect to the width in the left and right direction is five or more. It is particularly preferable that the linear light distribution pattern P is set such that the aspect ratio of the width in the front and rear direction with respect to the width in the left and right direction is 1:10 or more. In this way, for example, the linear light distribution pattern P can irradiate a range from 10 m to the 100 m in front of the vehicle V. In the case where a vertically elongated linear light distribution pattern having a larger aspect ratio than the above example is required, it is possible to cope with this by increasing the vertical and horizontal aspect ratio of the opening portion 232 of the light shielding member 230 or changing the magnification ratio of the light source image by the projection lens 220. Meanwhile, in the case where the opening portion of the light shielding member is formed in a rectangular shape having a uniform width, the irradiation width of the irradiated light distribution pattern is widened as it goes from the vicinity toward a place distant from the vehicle. On the contrary, in the present embodiment, since a trapezoidal light source image in which the width in the left and right direction is widened as it goes from the lower side toward the upper side is formed on the emission surface 232b by the trapezoidal opening portion 232, the linear light distribution pattern P has a substantially uniform width in any region in the front and rear direction of the vehicle V, as shown in FIG. 15.

Meanwhile, the lamp 200 according to the present embodiment is mounted on each of the left and right headlamps of the vehicle V and one linear light distribution pattern P is formed by each of the lamps 200, so that two parallel lines along the vehicle width of the vehicle V can be drawn on the road surface. Further, two opening portions are formed in parallel on the left and right sides in the light shielding member 230, so that two linear light distribution patterns P can be formed by the light passing through the two opening portions.

As described above, in the present embodiment, the lamp 200 includes the laser light source 210 for road surface drawing, the projection lens 220 through which laser light emitted from the laser light source 210 is transmitted, and the light shielding member 230 disposed between the laser light source 210 and the projection lens 220. The light shielding member 230 has the trapezoidal opening portion 232 through which at least apart of the laser light passes. The opening portion 232 of the light shielding member 230 can form, on the emission surface 232b, a rectangular light source image whose luminance is more uniform than the incidence surface 232a. With such a configuration of the lamp 200, a light source image with less luminance unevenness is formed by using the laser light source 210, and the light source image is projected so as to extend in the upper and lower direction more than the left and right direction of the lamp by the projection lens 220, so that the linear light distribution pattern P with less illuminance unevenness can be obtained.

Meanwhile, the lamp 200 may include a swivel mechanism for turning a light distribution direction of the lamp 200 leftward and rightward. The swivel mechanism may be configured such that the light distribution direction (the direction of the optical axis Ax of the projection lens 220) is moved leftward and rightward when the lamp 200 is mechanically turned by the swivel mechanism.

Figure 16:
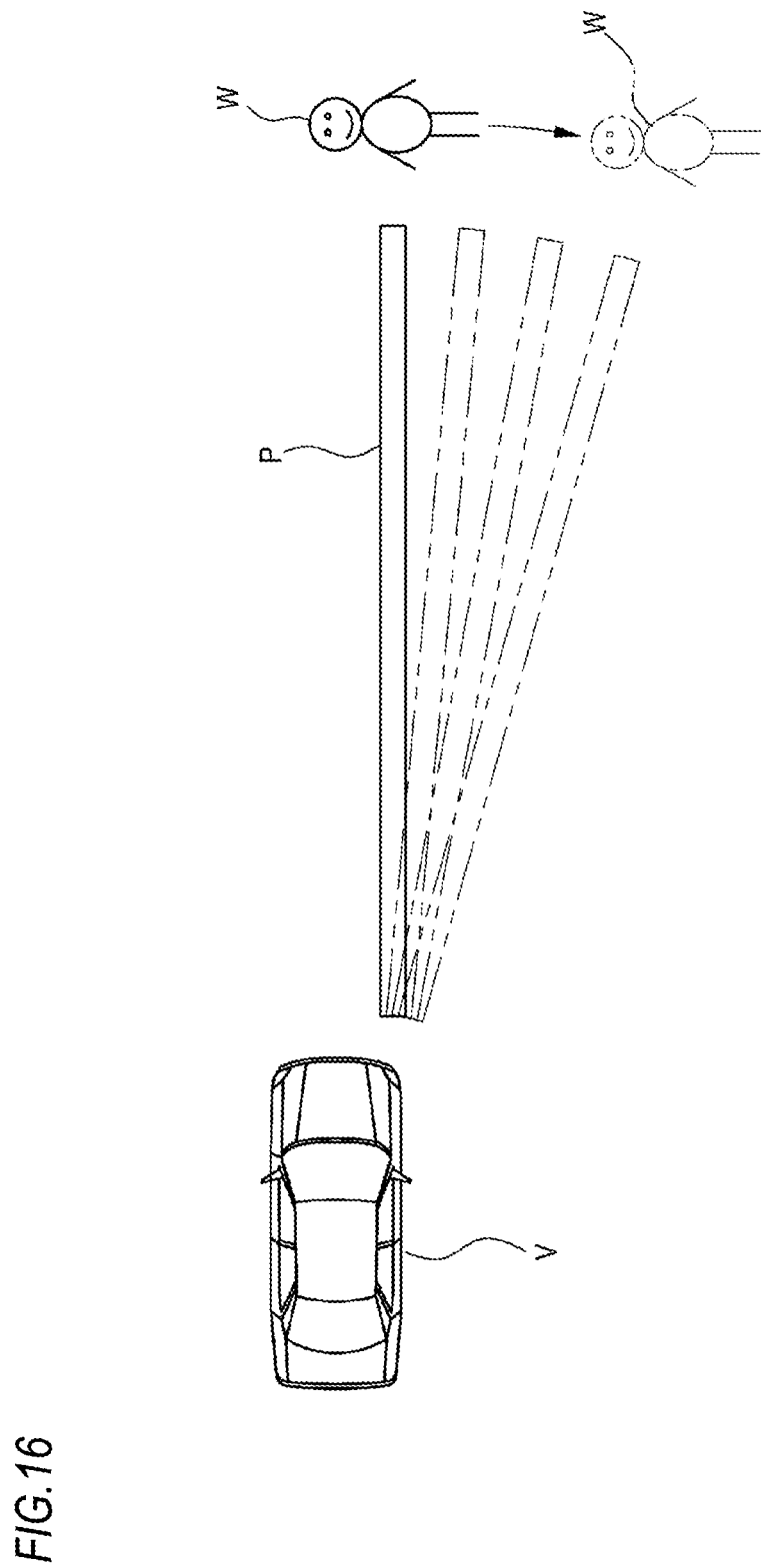
FIG. 16 is a view showing an example of a light distribution pattern which is formed by the vehicle lamp of the third embodiment.

In this way, the linear light distribution pattern P drawn on the road surface in front of the lamp can be moved in the normal direction (radial direction). As shown in FIG. 16, when a pedestrian W as an object moves to the left and right, the irradiation position of the linear light distribution pattern P can be changed such that the linear light distribution pattern P is irradiated toward the position of the pedestrian W by swiveling the lamp 200 in accordance with the movement of the pedestrian W.

Fourth Embodiment

Figure 17:
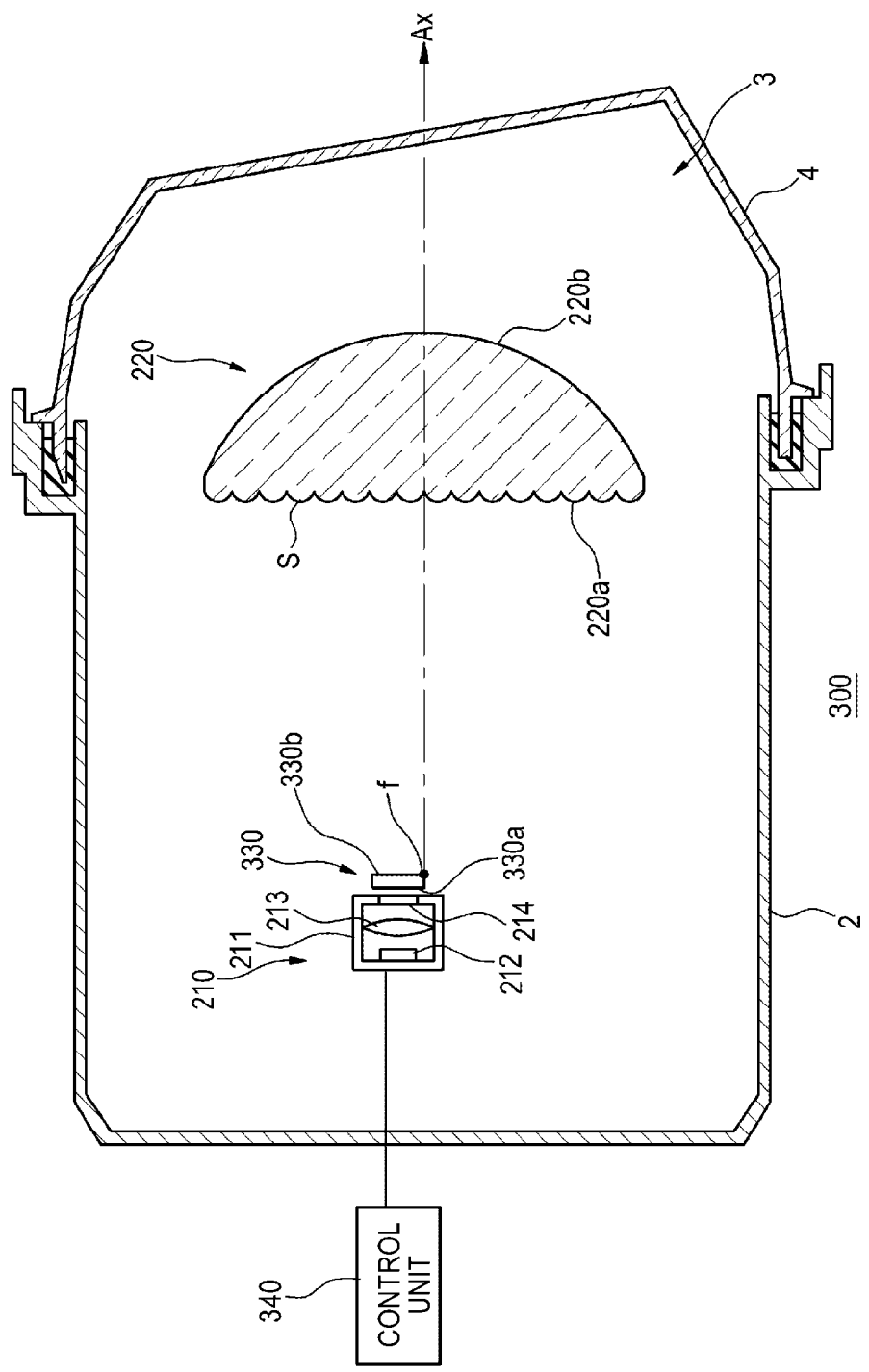
FIG. 17 is a vertical sectional view showing a schematic structure of a vehicle lamp according to a fourth embodiment of the disclosure.
Figure 18:
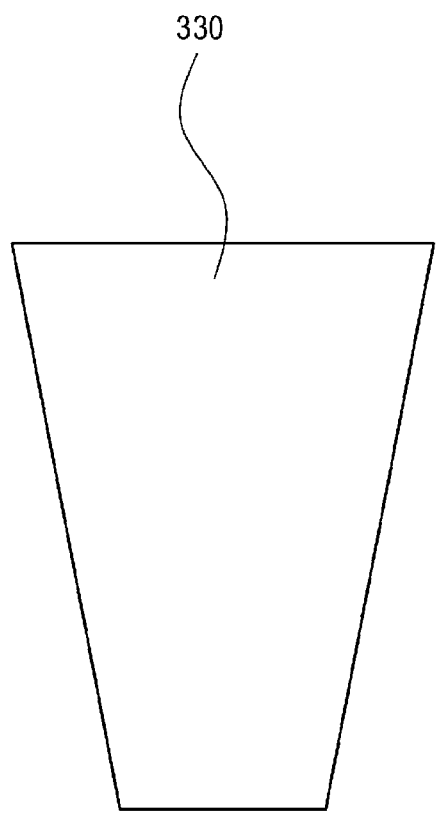
FIG. 18 is a front view of a diffusion member according to the fourth embodiment.

FIG. 17 is a vertical sectional view showing a schematic structure of a vehicle lamp according to a fourth embodiment, and FIG. 18 is a front view showing a diffusion plate according to the fourth embodiment.

As shown in FIG. 17, a lamp 300 includes the laser light source 210, the projection lens 220, and a diffusion plate 330. Each component is attached to the lamp body by a support mechanism (not shown). Since the configurations of the laser light source 210 and the projection lens 220 and the member constituting the lamp chamber 3 are the same as those of the third embodiment, a detailed description thereof will be omitted.

The diffusion plate 330 is a flat plate-like diffusion member which is located between the laser light source 210 and the projection lens 220 and in which its incidence surface 330a is disposed in proximity to the phosphor 214 of the laser light source 210. The sizes of the phosphor 214 and the incidence surface 330a of the diffusion plate 330 and the interval between the phosphor 214 and the incidence surface 330a are set so that all the light generated from the phosphor 214 is incident on the diffusion plate 330. The diffusion plate 330 is disposed along a plane orthogonal to the optical axis Ax of the projection lens 220, and a lower end thereof substantially coincides with the rear focal point f of the projection lens 220. The diffusion plate 330 is configured by a transparent member in which scattering agent is dispersed. Meanwhile, instead of dispersing the scattering agent inside the diffusion plate 330, a light diffusion step may be formed on the incidence surface 330a or an emission surface 330b of the diffusion plate 330, or embossing may be performed thereon.

As shown in FIG. 18, the diffusion plate 330 is formed in a trapezoidal shape in which the width is widened as it goes from the lower end side toward the upper end side. In this way, the light transmitted through the diffusion plate 330 forms, on the emission surface 330b of the diffusion plate 330, a trapezoidal light source image which is longer in the upper and lower direction than the left and right direction and in which the width in the left and right direction is widened from the lower side toward the upper side.

In such a lamp 300, all the light generated from the phosphor 214 of the laser light source 210 is incident on the incidence surface 330a of the diffusion plate 330. Since the scattering agent is dispersed inside the diffusion plate 330, it is possible to suppress the luminance unevenness (chromaticity unevenness) of light on the emission surface 330b. That is, in the present embodiment, since the light generated by the phosphor 214 of the laser light source 210 is transmitted through the diffusion plate 330, it is possible to form, on the emission surface 330b of the diffusion plate 330, a light source image with less luminance unevenness (with more uniform luminance) than the incidence surface 330. Therefore, according to the present embodiment, similar to the third embodiment, it is possible to draw the linear light distribution pattern P with less illuminance unevenness on the road surface in front of the vehicle.

Fifth Embodiment

Figure 19:
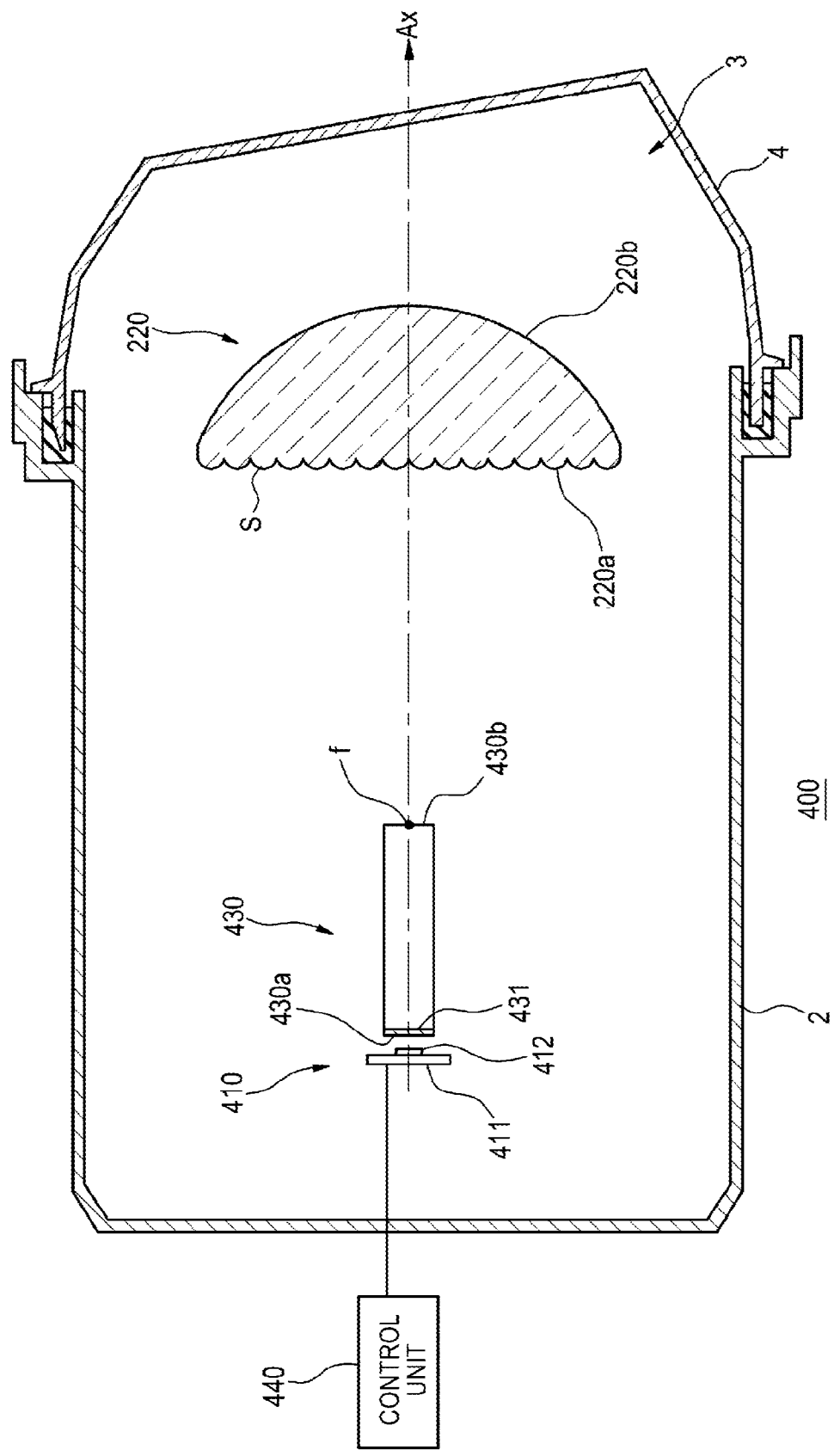
FIG. 19 is a vertical sectional view showing a schematic structure of a vehicle lamp according to a fifth embodiment of the disclosure.
Figure 20:
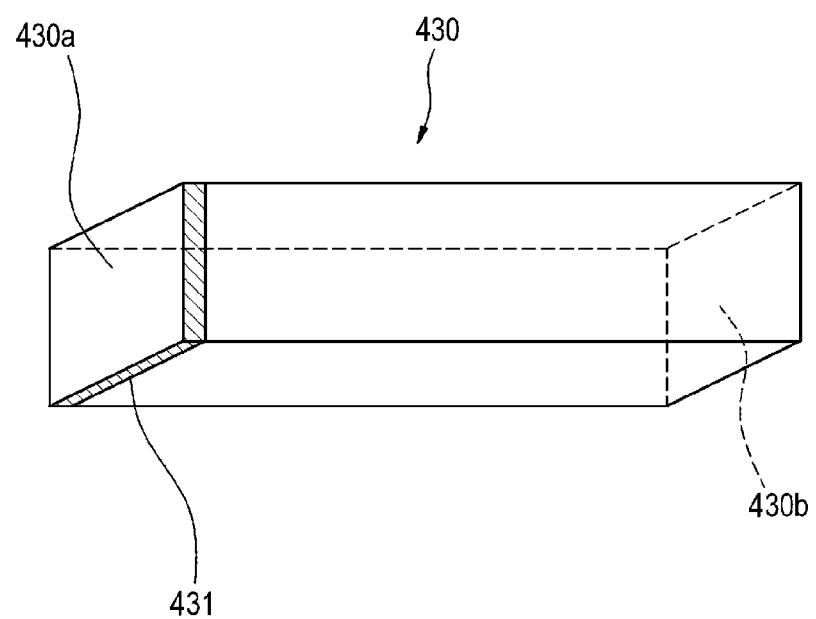
FIG. 20 is a front perspective view of a rod integrator according to the fifth embodiment.

FIG. 19 is a perspective view showing a schematic structure of a vehicle lamp according to a fifth embodiment, and FIG. 20 is a perspective view of a rod integrator according to the fifth embodiment.

As shown in FIG. 19, a lamp 400 includes a laser light source 410, the projection lens 220, and a rod integrator 430 (an example of an additional lens). Each component is attached to the lamp body by a support mechanism (not shown). Since the configurations of the projection lens 220 and the member constituting the lamp chamber 3 are the same as those of the third embodiment, a detailed description thereof will be omitted.

The laser light source 410 includes a base portion 411 and a laser chip 412. The laser chip 412 is disposed so that its emission surface faces the incidence surface 220a of the projection lens 220 via the rod integrator 430.

The rod integrator 430 is disposed between the laser light source 410 and the projection lens 220. As shown in FIG. 20, the rod integrator 430 is a rectangular columnar lens having an incidence surface 430a and an emission surface 430b. The incidence surface 430a of the rod integrator 430 is disposed in proximity to the laser chip 412, and the emission surface 430b thereof is disposed in the vicinity of the rear focal point f of the projection lens 220. The sizes of the laser chip 412 and the incidence surface 430a of the rod integrator 430 and the interval between the laser chip 412 and the incidence surface 430a are set so that all the light emitted from the laser chip 412 is incident on the rod integrator 430. A phosphor layer 431 is formed on the incidence surface 430a of the rod integrator 430. The phosphor layer 431 is excited by light emitted from the laser light source 410 to emit fluorescence. Meanwhile, the phosphor layer 431 may be formed on the side of the emission surface 430b of the rod integrator 430.

In such a lamp 400, all the light emitted from the laser chip 412 of the laser light source 410 is incident on the rod integrator 430 from the incidence surface 430a of the rod integrator 430. The light incident on the incidence surface 430a is excited and emitted by the phosphor layer 431. Then, the rod integrator 430 totally reflects the excited and emitted light therein and emits it from the emission surface 430b toward the front of the lamp. In this way, the luminance distribution on the emission surface 430b of the rod integrator 430 can be made uniform. That is, in the present embodiment, the light emitted from the laser chip 412 is transmitted through the rod integrator 430, so that it is possible to form, on the emission surface 430b of the rod integrator 430, a light source image with less luminance unevenness than the incidence surface 430a. Therefore, according to the present embodiment, similar to the third embodiment, it is possible to draw the linear light distribution pattern P with less illuminance unevenness on the road surface in front of the vehicle.

Meanwhile, as the laser light source, a light source having the same configuration as the laser light source 210 of the third embodiment may be used. In this case, it is not necessary to form the phosphor layer 431 on the incidence surface 430a or the emission surface 430b of the rod integrator 430.

Sixth Embodiment

Figure 21:
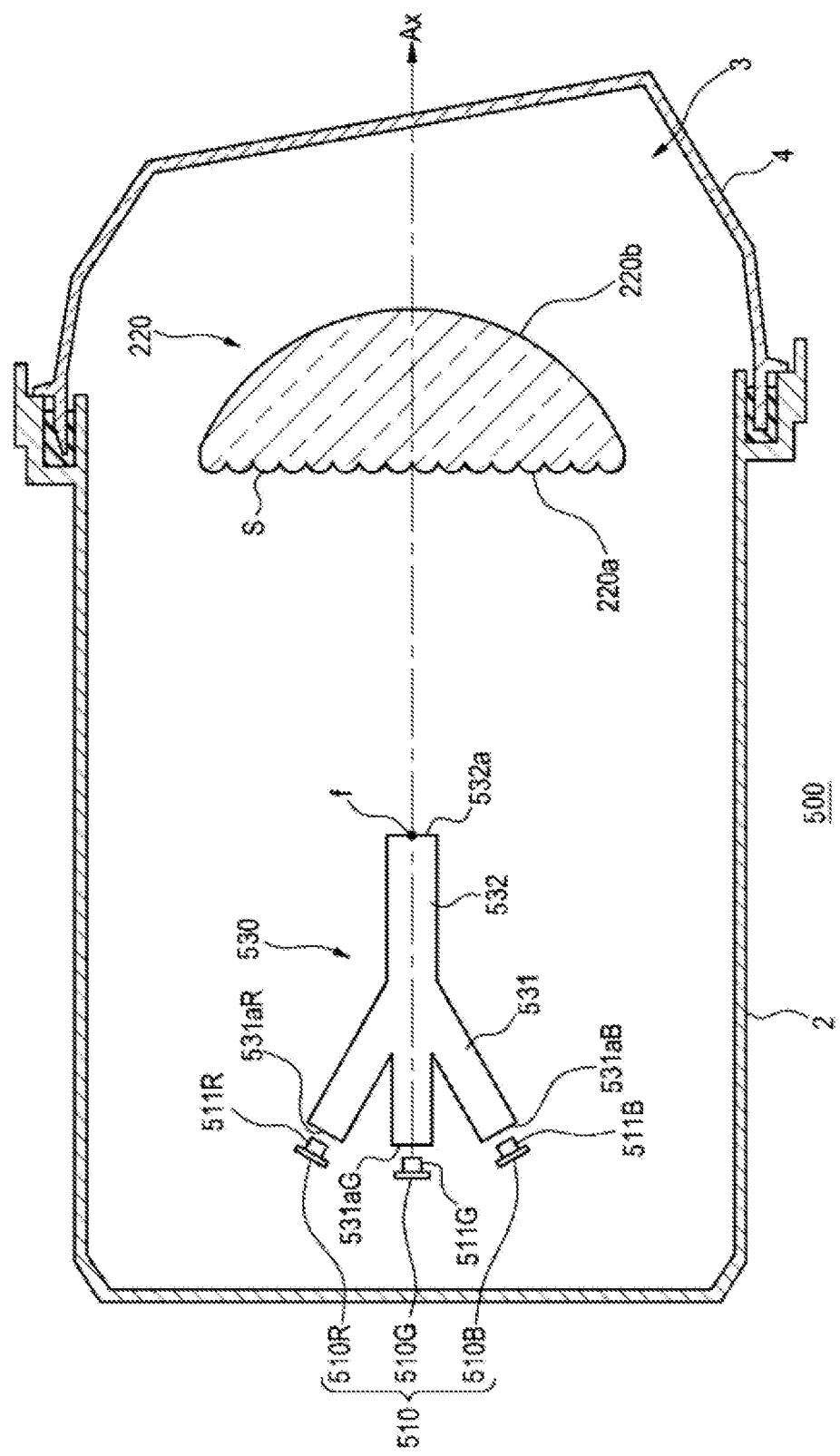
FIG. 21 is a vertical sectional view showing a schematic structure of a vehicle lamp according to a sixth embodiment of the disclosure.

FIG. 21 is a vertical sectional view showing a schematic structure of a vehicle lamp according to a sixth embodiment.

As shown in FIG. 21, a lamp 500 includes a light source unit 510, the projection lens 220, and a light guide 530. Each component is attached to the lamp body by a support mechanism (not shown). Since the configurations of the projection lens 220 and the member constituting the lamp chamber 3 are the same as those of the third embodiment, a detailed description thereof will be omitted.

The light source unit 510 includes a red laser light source 510R for emitting red laser light, a green laser light source 510G for emitting green laser light, and a blue laser light source 510B for emitting blue laser light. The red laser light source 510R has a laser chip 511R for emitting red light, the green laser light source 510G has a laser chip 511G for emitting green light, and the blue laser light source 510B has a laser chip 511B for emitting blue light.

The light guide 530 includes three branch portions 531 and a condenser portion 532. Respective incidence surfaces 531aR, 531aG, 531aB of the branch portions 531 are disposed in proximity to the respective laser elements 511R, 511G, 511B, and an emission surface 532a on the side of the condenser portion 532 is disposed in the vicinity of the rear focal point f of the projection lens 220. Red laser light emitted from the red laser light source 510R is incident on the incidence surface 531aR of the uppermost branch portion 531 among the three branch portions 531 and guided to the condenser portion 532. Green laser light emitted from the green laser light source 510G is incident on the incidence surface 531aG of the center branch portion 531 among the three branch portions 531 and guided to the condenser portion 532. Blue laser light emitted from the blue laser light source 510B is incident on the incidence surface 531aB of the lowermost branch portion 531 among the three branch portions 531 and guided to the condenser portion 532. The respective R-G-B color laser light guided by the respective branch portions 531 in this manner is combined by the condenser portion 532 to generate white light. The white light generated by the condenser portion 532 is emitted from the emission surface 532a toward the projection lens 320.

In this manner, in the present embodiment, the R-G-B light emitted from the respective laser light sources 510R, 510G, 510B is combined in the light guide 530 to generate white light, so that it is possible to form, on the emission surface 532a of the light guide 530, a light source image with less luminance unevenness than the incidence surfaces 531aR, 531aG, 531aB of the respective branch portions 531. Therefore, according to the present embodiment, similar to the third embodiment, it is possible to draw the linear light distribution pattern P with less illuminance unevenness on the road surface in front of the vehicle.

Although the examples of the respective embodiments of the disclosure have been described above, the disclosure is not limited to the above-described embodiments, and other configurations can be adopted, if necessary.

In the first embodiment described above, as shown in FIG. 4, the linear light distribution pattern P extending largely in the front and rear direction more than the left and right direction of the vehicle is formed. However, the light distribution pattern drawn on the road surface is not limited to the linear light distribution pattern P. For example, in order to obtain a well-shaped light distribution pattern firm the vicinity to a place distant from the vehicle at the time of drawing a light distribution pattern having an arbitrary shape other than the shape indicated by the arrow on the road surface, a light source image on the rear focal point f of the projection lens 20 may be inclined with respect to the upper and lower direction D orthogonal to the optical axis Ax of the projection lens 20.

In the third to sixth embodiments described above, the light shielding member or the diffusion plate or the like is disposed between the laser light source and the projection lens to form the rectangular light source image with less luminance unevenness, but the disclosure is not limited to this example. For example, the phosphor (e.g., the phosphor 214 of the third embodiment) provided in the penetrating portion of the housing of the laser light source may be formed in a rectangular shape, and the rectangular light source image formed by the light generated from the phosphor may be directly incident on the projection lens. At this time, in order to reduce the luminance unevenness of the rectangular light source image formed on the light emitting surface of the phosphor, it is desirable to appropriately set the shape of the condenser lens and the size of the phosphor so that only the light with high luminance among the light source image formed by the light transmitted through the condenser lens is incident on the phosphor.

Figure 22A:
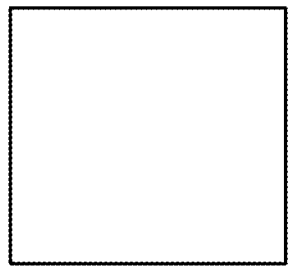
FIGS. 22A to 22E are views showing modifications of light source images formed by the vehicle lamps according to the third to sixth embodiments of the disclosure.
Figure 22B:
Figure 22C:
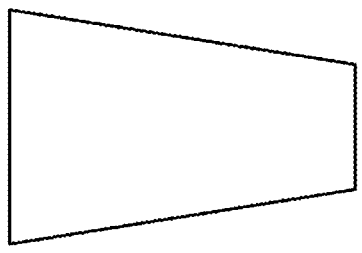
Figure 22D:
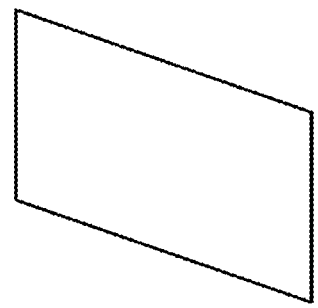
Figure 22E:
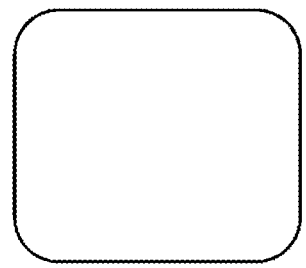

Meanwhile, as the rectangular light source image, in addition to the shapes described in the above embodiments, for example, light source images having various shapes as shown in FIGS. 22A to 22E can be formed. FIG. 22A shows a substantially square shape, FIG. 22B shows a rectangular shape extending in the left and right direction more than the front and rear direction, FIG. 22C shows a transverse trapezoidal shape in which parallel sides (upper base and lower base) constitute the left side and the right side, FIG. 22D shows a parallelogram shape, and FIG. 22E shows a rectangular shape with rounded corners. These shapes can be formed by appropriately changing the shapes of the light emitting element 12, the opening portion 232, the diffusion plate 330, and the rod integrator 430.

The present application is based on Japanese Patent Application (Patent Application No. 2016-59877) filed on Mar. 24, 2016, and Japanese Patent Application (Patent Application No. 2016-082004 filed on Apr. 15, 2016, the contents of which are incorporated herein as a reference.

The invention claimed is:

1. A vehicle lamp comprising:
a light source unit for road surface drawing capable of forming a light source image longer in an upper and lower direction than a left and right direction of the lamp; and
a projection lens through which light forming the light source image is transmitted and which projects a predetermined light distribution pattern on a road surface,
wherein a lower end of a light emitting surface or a lower end of a light transmitting surface of the light source unit is disposed on a rear focal point of the projection lens, and
wherein the light emitting surface or the light transmitting surface is inclined with respect to an upper and lower direction orthogonal to an optical axis of the projection lens.

2. The vehicle lamp according to claim 1,
wherein the light source unit includes one light emitting element which is disposed in the vicinity of the rear focal point and which is capable of forming a light source image extending upward from a side of the optical axis, and
wherein the light emitting surface of the light emitting element is arranged in an inclined manner so as to be farther separated to a rear side than the rear focal point as it goes toward the upward direction.

3. The vehicle lamp according to claim 1,
wherein the light source unit includes a plurality of light emitting elements which are disposed in the vicinity of the rear focal point, which are arranged so as to be able to form a light source image extending upward from a side of the optical axis, and which can be individually turned on and off, and
wherein light emitting surfaces of the plurality of light emitting elements are arranged in an inclined manner so as to be farther separated to a rear side than the rear focal point as they go from the light emitting element disposed in the vicinity of the rear focal point toward the light emitting elements on an upward direction side thereof.

4. A vehicle lamp control system comprising:
the vehicle lamp according to claim 3; and
a lighting control unit configured to control lighting of the plurality of light emitting elements,
wherein the lighting control unit is configured to change luminous intensity of each light emitting element in accordance with a distance from the projection lens to a light distribution pattern projected on a road surface.

5. A vehicle comprising:
the vehicle lamp control system according to claim 4.

6. The vehicle lamp according to claim 1,
wherein the light source unit includes at least one light emitting element and a light shielding member which is located between the at least one light emitting element and the projection lens and which is disposed on the rear focal point,
wherein the light shielding member has an opening portion extending upward from a side of the optical axis, and
wherein a light transmitting surface of the light shielding member is arranged in an inclined manner so as to be farther separated to a rear side than the rear focal point as it goes toward the upward direction of the opening portion.

7. A vehicle comprising:
the vehicle lamp according to claim 1.

8. A vehicle lamp comprising:
a light source unit for road surface drawing capable of forming a light source image having a non-uniform width; and
a projection lens through which light forming the light source image is transmitted and which projects a predetermined light distribution pattern on a road surface,
wherein, in the light source image within a focal plane of the projection lens, a region of a part projected on a place distant from the vehicle has a width in a left and right direction of the lamp narrower than a region of a part projected on a vicinity of the vehicle, and wherein a lower end of a light emitting surface or a lower end of a light transmitting surface of the light source unit is disposed on a rear focal point of the projection lens.

9. The vehicle lamp according to claim 8,
wherein the light source unit includes one light emitting element which is disposed in a vicinity of a rear focal point of the projection lens and which is capable of forming a light source image extending upward from a side of an optical axis of the projection lens, and
wherein a width of the light emitting element is increased as it goes from the vicinity of the rear focal point toward an upper side.

10. The vehicle lamp according to claim 8,
wherein the light source unit includes a plurality of light emitting elements which are disposed in a vicinity of a rear focal point of the projection lens, which are arranged so as to be able to form a light source image extending upward from a side of an optical axis of the projection lens, and which can be individually turned on and off, and
wherein the plurality of light emitting elements is arranged such that a number thereof increases as it goes from the light emitting element disposed in the vicinity of the rear focal point toward the light emitting elements on an upward direction side thereof.

11. A vehicle lamp control system comprising:
the vehicle lamp according to claim 10; and
a lighting control unit configured to control lighting of the plurality of light emitting elements,
wherein the lighting control unit is configured to change luminous intensity of each light emitting element in accordance with a distance from the projection lens to a light distribution pattern projected on a road surface.

12. The vehicle lamp according to claim 8,
wherein the light source unit includes at least one light emitting element and a light shielding member which is located between the at least one light emitting element and the projection lens and which is disposed in a vicinity of a rear focal point of the projection lens, and
wherein the light shielding member includes an opening portion of which a width increases as it goes from the vicinity of the rear focal point toward an upper side.

13. A vehicle comprising:
the vehicle lamp according to claim 8.

* * * * *